United States Patent
Yoda et al.

(10) Patent No.: US 8,479,870 B2
(45) Date of Patent: Jul. 9, 2013

(54) POWER STEERING SYSTEM

(75) Inventors: Toshiro Yoda, Higashimatsuyama (JP); Shogo Ishikawa, Hiki-gun (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 65 days.

(21) Appl. No.: 13/316,711

(22) Filed: Dec. 12, 2011

(65) Prior Publication Data
US 2012/0160594 A1    Jun. 28, 2012

(30) Foreign Application Priority Data
Dec. 24, 2010    (JP) .................................. 2010-288182

(51) Int. Cl.
*B62D 5/06*    (2006.01)

(52) U.S. Cl.
USPC .......................................... 180/422; 180/421

(58) Field of Classification Search
USPC ......................................... 180/422, 421, 417
See application file for complete search history.

(56) References Cited

U.S. PATENT DOCUMENTS

| | | | |
|---|---|---|---|
| 6,279,675 B1 * | 8/2001 | Bohner et al. ............... | 180/403 |
| 6,366,842 B1 * | 4/2002 | Kaji et al. ..................... | 701/41 |
| 6,945,351 B2 * | 9/2005 | Fujita ............................ | 180/422 |
| 6,978,859 B2 * | 12/2005 | Torizawa ....................... | 180/405 |
| 7,213,676 B2 * | 5/2007 | Soeda et al. .................. | 180/417 |
| 7,596,441 B2 * | 9/2009 | Yokota et al. .................. | 701/41 |
| 7,730,993 B2 * | 6/2010 | Watanabe ...................... | 180/422 |
| 7,735,596 B2 * | 6/2010 | Sasaki et al. .................. | 180/422 |
| 2005/0205338 A1 | 9/2005 | Okada et al. | |
| 2007/0224066 A1 | 9/2007 | Yamamuro et al. | |

FOREIGN PATENT DOCUMENTS

JP    2005-255001 A    9/2005

* cited by examiner

*Primary Examiner* — Kevin Hurley
*Assistant Examiner* — Michael Stabley
(74) *Attorney, Agent, or Firm* — Crowell & Moring LLP

(57) ABSTRACT

Disclosed is a power steering system comprising: a control valve disposed in the steering mechanism to selectably supply a working liquid supplied from a first pump or a second pump to a pair of pressure chambers of a power cylinder providing a steering force for at least one steered wheel in accordance with a rotational steering operation of a steering wheel; a first switching valve disposed between the first pump and the control valve to switch a communication and an interruption of the working liquid between the first pump and the control valve; and a second switching valve disposed between the second pump and the control valve to switch the communication and the interruption of the working liquid between the second pump and the control valve, a communication state and an interruption state being selectably formed in the second switching valve when the first switching valve is in the communication state.

16 Claims, 15 Drawing Sheets

⟨NORMAL STATE⟩

⟨MAIN PUMP EXPANDED VIEW⟩

POWER STEERING SYSTEM

BACKGROUND OF THE INVENTION (1) Field of the Invention

The present invention relates to a power steering system which obtains an assistance force of a steering operation according to an actuation of a pump.

(2) Description of Related Art

A Japanese Patent Application First Publication (tokkai) No. 2005-255001 published on Sep. 22, 2005 (which corresponds to a United Patent Application Publication No. 2005/0205338) exemplifies a previously proposed power steering system for an automotive vehicle in which a main pump which is driven by an engine and a sub pump is driven by an engine are installed and a steering assistance can be made even during an engine stop by a drive of the sub pump when the main pump is in an abnormal state.

SUMMARY OF THE INVENTION

However, only one switching valve to switch a supply of working oil from the main pump and the sub pump to a power cylinder is installed so that a simultaneous use of both of the main pump and the sub pump cannot be made.

It is an object of the present invention to provide a power steering system which is capable of achieving an optimum pump drive state according to a required flow quantity.

According to one aspect of the present invention, there is provided a power steering system comprising: a power cylinder equipped with a pair of pressure chambers to provide a steering force for at least one of steered wheels on a basis of a pressure difference between the pair of pressure cylinders; a steering mechanism configured to turn the steered wheel in accordance with a rotational steering operation of a steering wheel; a first pump equipped with a first drive shaft to suck and drain a working liquid along with a revolution of the first drive shaft to supply the working liquid to the power cylinder, the first pump being rotationally driven by means of a first driving source; a second pump equipped with a second drive shaft to suck and drain the working liquid along with the revolution of the second drive shaft to supply the working liquid to the power cylinder; a second driving source which is a driving source different from the first driving source, is constituted by an electric motor, and rotationally drives the second pump; a control valve disposed in the steering mechanism to selectably supply the working liquid supplied from the first pump or second pump to the pair of pressure chambers in accordance with a rotational steering operation of the steering wheel; a first switching valve disposed between the first pump and the control valve to switch a communication and an interruption of the working liquid between the first pump and the control valve; and a second switching valve disposed between the second pump and the control valve to switch the communication and the interruption of the working liquid between the second pump and the control valve, a communication state and an interruption state being selectably formed in the second switching valve when the first switching valve is in the communication state.

According to another aspect of the present invention, there is provided a power steering system, comprising: a power cylinder having a pair of pressure chambers and providing a steering force for at least one steered wheel on a basis of a pressure difference between the pair of pressure chambers; a steering mechanism configured to turn the steered wheel in accordance with a rotational steering operation of a steering wheel; a pump housing having a pump element housing section at an inner side thereof; a cam ring disposed movably within the pump element housing section and formed in an annular shape; a first drive shaft rotatably supported on the pump element housing section and formed in an annular shape; a rotor disposed within the cam ring, having a plurality of radially extended slits arranged along a circumferential direction of the rotor and rotationally driven through the first drive shaft; a plurality of vanes advanceably or retractably (namely, movably) disposed along the respective slits of the rotor to form a plurality of pump chambers together with the cam ring and the rotor; a suction inlet disposed in the pump housing and opened to a region of the plurality of pump chambers in which a volume thereof is increased along with the revolution of the rotor; a draining outlet disposed in the pump housing and opened to a region of the plurality of pump chambers in which a volume thereof is decreased along with the revolution of the rotor; a suction passage disposed in the pump housing to be communicated with the suction inlet; a draining passage disposed in the pump housing to be communicated with the draining outlet; a pair of fluid chambers formed between the pump element housing section and the cam ring, a first fluid pressure chamber thereof being formed at a side at which the volume thereof is decreased along with a movement of the cam ring in a direction toward which an eccentricity of the cam ring with respect to the drive shaft is increased and a second fluid pressure chamber thereof being formed in a direction in which the volume thereof is decreased along with the movement of the cam ring in a direction toward which the eccentricity of the cam ring with respect to the drive shaft is increased; a control valve disposed in the pump housing to control a pressure in the first fluid pressure chamber to control a displacement of the cam ring according to a pressure difference between the first fluid pressure chamber and the second fluid pressure chamber; a first pump constituted by an electromagnetic valve, disposed in the pump housing, controlled on a basis of a rotational steering operation of a steering wheel, and which controls a draining quantity per revolution of the rotor by controlling the displacement of the cam ring; a second pump having a second drive shaft and performing suction and draining of a working liquid along with the revolution of the second drive shaft to supply the working liquid to the power cylinder;

a second driving source which is the driving source different from the first driving source, is constituted by an electric motor, and rotationally drives the second pump; a control valve disposed in the steering mechanism to selectably supply the working liquid supplied from the first pump or the second pump to the pair of pressure chambers in accordance with the rotational steering operation of the steering wheel; and switching valves disposed among the first pump, the second pump, and the control valve to switch a communication of the working liquid and an interruption thereof between the first pump and the control valve and to switch the communication of the working liquid and the interruption thereof between the second pump and the control valve.

DETAILED DESCRIPTION OF THE INVENTION

First Embodiment

Figure 1:
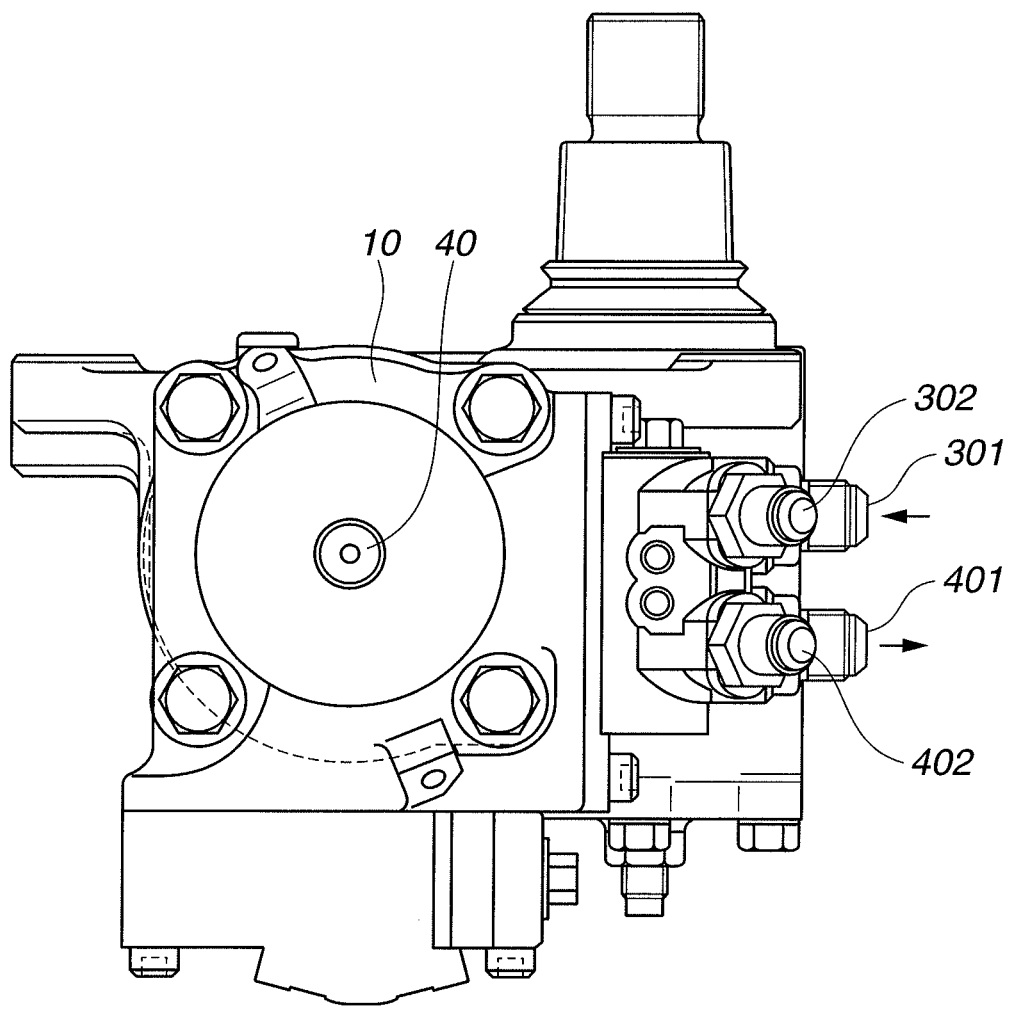
FIG. 1 is a plan view representing a power steering system in a first preferred embodiment according to the present invention.
Figure 2:
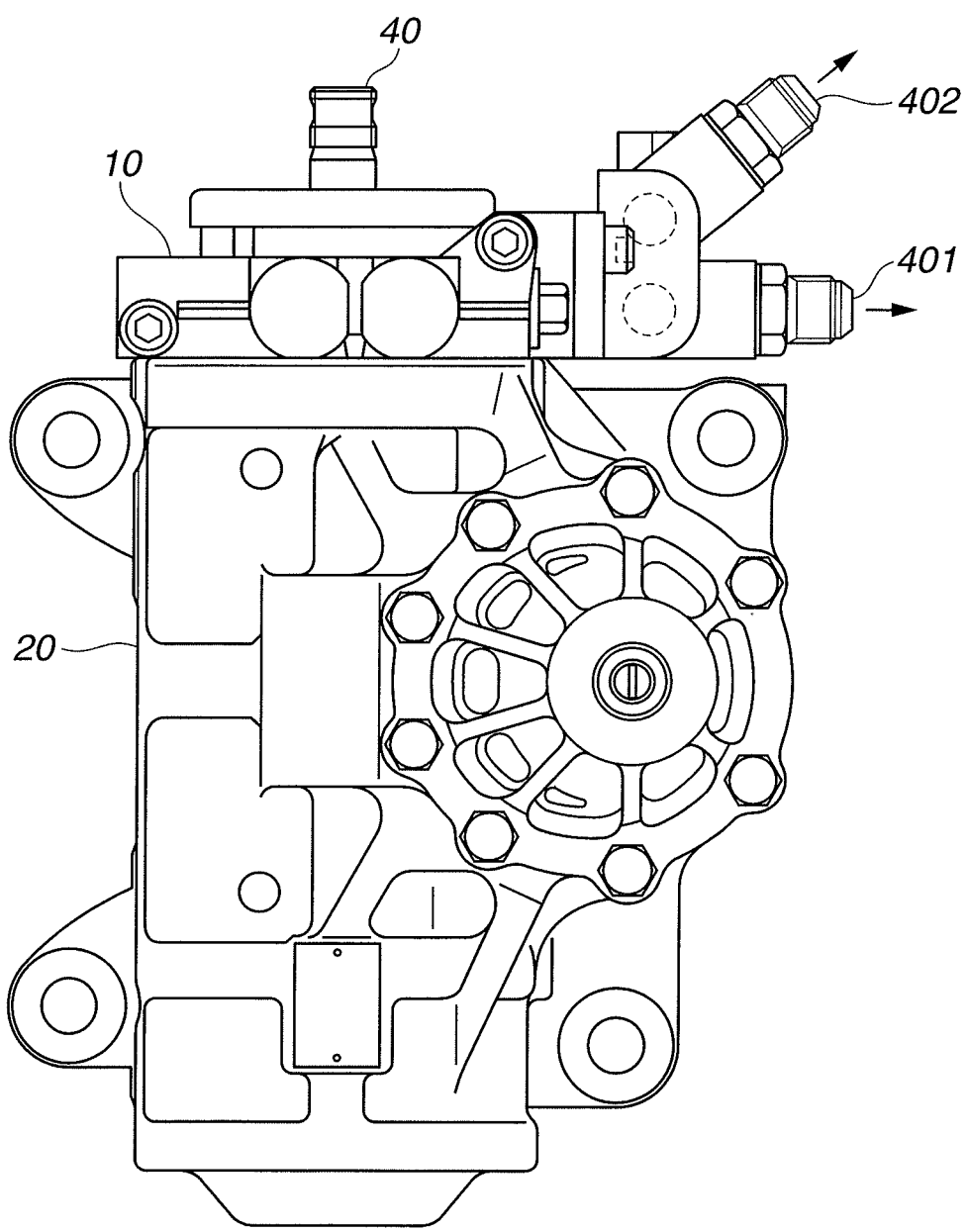
FIG. 2 is a side view representing the power steering system in the first preferred embodiment according to the present invention.
Figure 3:
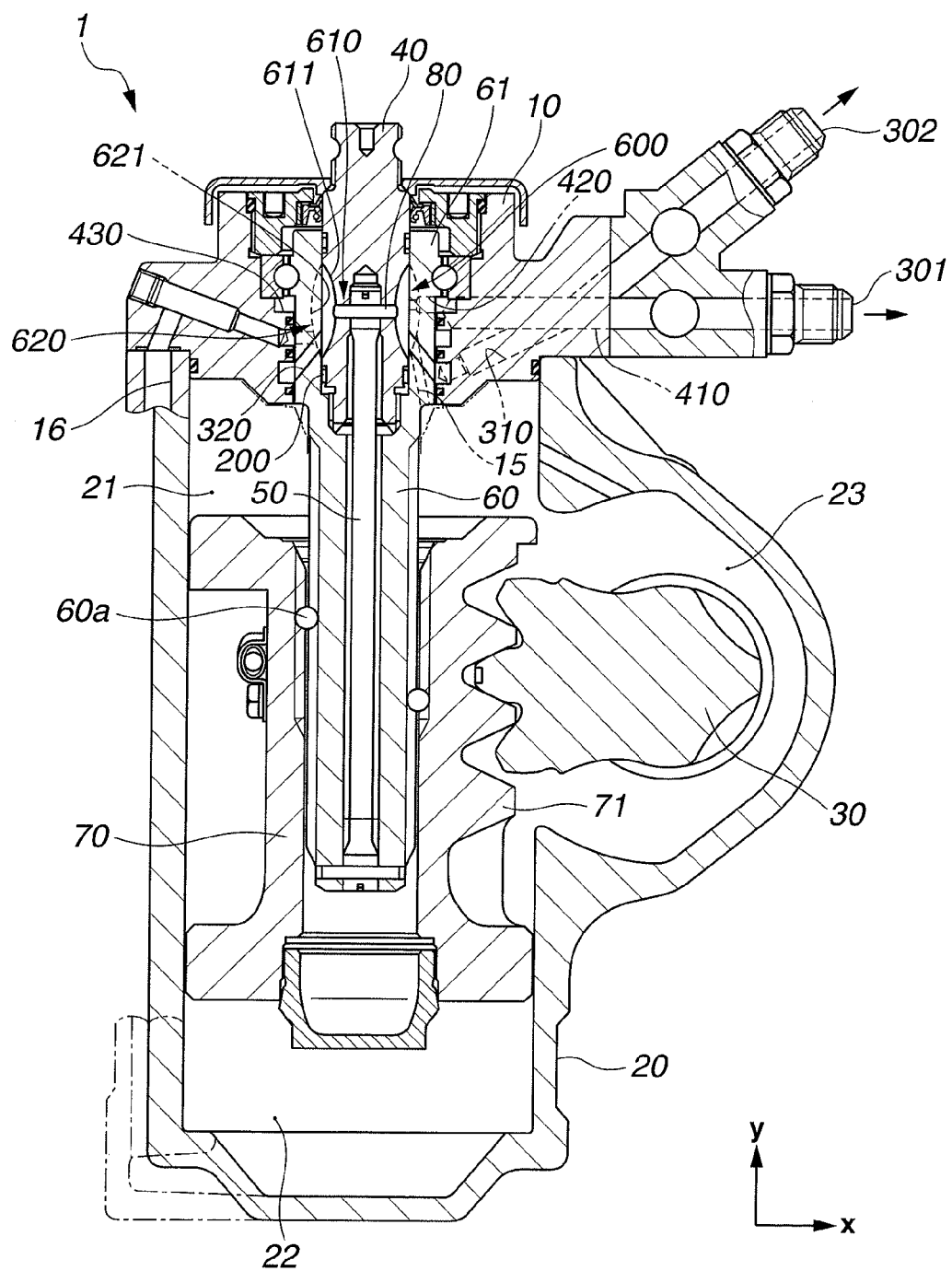
FIG. 3 is a cross sectional view representing the power steering system in the first preferred embodiment according to the present invention.

Reference will, hereinafter, be made to the drawings in order to facilitate a better understanding of the present invention. First, a power steering mechanism will be described and a whole system having the power steering mechanism will be described. FIG. 1 shows a plan view representing a power steering system in a first preferred embodiment according to the present invention. FIG. 2 shows a side view representing the power steering system in the first preferred embodiment according to the present invention. FIG. 3 shows a cross sectional view of the power steering system in the first preferred embodiment according to the present invention. It should be noted that an axial direction of input and output shafts 40, 60 is defined as an y axis and an axial direction is defined as a positive. In addition, a sector shaft 30 side as viewed from piston side 70 is an x-axis positive direction. Power steering system 1 in the first preferred embodiment is, so-called, an integral type power steering system (iPS) and includes: a first housing 10 housing a control valve 600 to switch an assistance direction; a second housing 20 housing piston 70 to generate an assistance force according to a hydraulic pressure; and a sector shaft 30 which is rotated according to a reciprocating motion of a piston 70 to turn steered wheels. Both of first housing 10 and second housing 20 are approximately of cup-shaped members and are coupled to each other at mutual axial openings thereof. Input shaft 40 connected to a steering wheel is inserted into an axial bottom section of first housing 10 and piston 70 within second housing 20 is slid in the axial direction by means of the hydraulic pressure in accordance with a revolution of input shaft 40. A main valve unit MVU coupled to a main pump MP and a sub valve unit SVU coupled to a sub pump SP are installed within first housing 10. Intake ports 301, 302 and exhaust ports 401, 402 are installed which perform supply and exhaust of a working oil are disposed in main valve unit MVU and in sub valve unit SVU. It should be noted that the details of these valve units will be described later. In addition, second housing 20 and sector shaft 30 are mutually at a right angle to each other in the axial direction. Teeth disposed on piston 70 within second housing 20 and teeth disposed on sector shaft 30 are meshed to one another and a slide motion of piston 70 causes sector shaft 30 to be rotated to perform a steering assistance (assist).

Piston 70 is housed movably in an axial direction of piston 70 within second housing 20. This piston 70 serves to partition a first oil chamber 21 at an input shaft side and a second oil chamber 22 at a cup shaped bottom section side maintaining a liquid tight structure. Input shaft 40 is coupled to an output shaft 60 by means of a torsion bar 50. A pin member 80 serves to couple torsion bar 50 and output shaft 60. This pin member 80 is disposed at a position opposing against part of a second valve groove 621 at which an exhaust oil passage 420 of an outer valve 620 is opened. Output shaft 60 is inserted in the axial direction of piston 70 and fitted into piston 70 through a ball screw mechanism (ball-and-nut) 60. A piston teeth section 71 which is inscribed along a peripheral direction is installed on an outer periphery of piston 70. This piston teeth section 71 serves to make piston 70 mesh with sector shaft 30. Second housing 20 is disposed in such a way that an axis of second housing 20 is orthogonal to an axis of sector to shaft 30. A part of second housing 20 in a diameter direction is provided with a sector shaft storing section 23 which stores a part of sector shaft 30. This sector shaft storing section 23 performs an introduction of working oil to communicate with a first oil chamber 21 and performs a is lubrication of the mesh between sector shaft 30 and piston teeth section 71.

First oil chamber 21 within second housing 20 is communicated with a control valve 600 through a first oil chamber communication passage 15 disposed in a first housing 10 and second oil chamber 22 is communicated with a control valve 600 through a second oil chamber communication passage 16 bridging between second housing 20 and first housing 10. That is to say, a power cylinder is constituted by first housing 10 and second housing 20. A pair of pressure chambers are formed between upper and lower portions of piston 70. Then, a steering mechanism configured to turn the steered wheels in accordance with a rotational steering operation of a steering wheel is constituted by the above-described elements.

Control valve 600 is constituted by an inner valve 610 formed on an outer periphery of input shaft 40 and an outer valve 620 formed on an inner periphery of output shaft 60.

Inner valve 610 is formed in such a way that an outer periphery of input shaft 40 is recessed in the inner peripheral direction and outer valve 620 is formed in such a way that an inner periphery of output shaft 60 is recessed in the outer peripheral direction.

Inner valve 610 includes a first valve groove 611 which recesses in an inner diameter direction thereof and outer valve 620 includes a second valve groove 621 which recesses in an outer diameter direction thereof. These first and second valve grooves 611, 621 are disposed in plural number in the peripheral direction and a seal material is disposed between each groove 611, 621. Second valve groove 621 is coupled to suction ports 301, 302 via oil passages 310, 320. Second valve groove 621 is coupled to drain ports 401, 402 via valve side return passages 410, 420 and a groove 430 installed on an inner periphery of first housing 10. Control valve 600 functions as a control valve mechanism which performs an introduction or exhaust of oil from suction ports 301,302 or drain ports 401, 402 to first and second oil chambers 21, 22. When input shaft 40 is relatively rotated toward a right side with respect to output shaft 60, the pump (not shown) is communicated with first oil chamber 21. When input shaft 40 is relatively rotated toward a left side with respect to output shaft 60, the pump (not shown) is communicated with second oil chamber 22.

Figure 4:
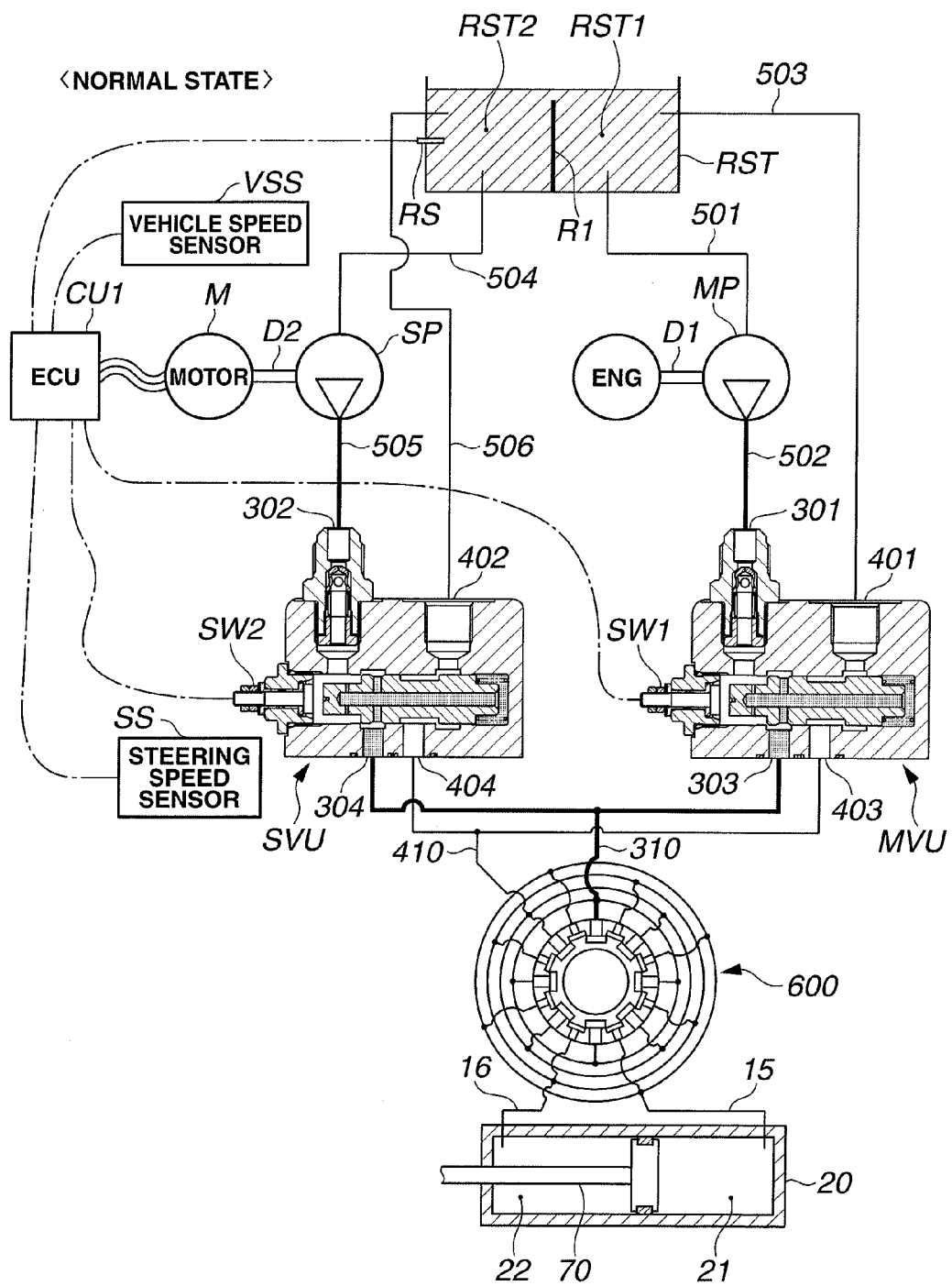
FIG. 4 is a system configuration view representing the power steering system in the first preferred embodiment according to the present invention.

FIG. 4 shows a system configuration view of the power steering system in the first preferred embodiment according to the present invention. Power steering system 1 in the first embodiment includes: a main pump MP driven by an engine ENG and a sub pump SP driven by an electric motor M. Main pump MP is a variable capacity (displacement) vane pump having a flow quantity (rate) control valve and is driven by a first drive shaft D1 driven by engine ENG. When a drain quantity (drain rate) of main pump MP has reached to a preset natural drain quantity (natural drain rate), a flow quantity equal to or larger than the natural drain quantity is cut out so that an approximately constant drain flow quantity (drain flow rate) is at all times secured at a whole rotation speed region equal to or larger than an engine idling speed of engine ENG. A structure of the variable displacement (capacity) vane pump is well known (for example, a United States Patent Application Publication No. US2007/0224066 published on Sep. 27, 2007(, the disclosure of which is herein incorporated by reference)) and, thus, the detailed explanation thereof will, herein, be omitted. Sub pump SP is driven by means of electric motor M to achieve a drain flow quantity (drain flow rate) in accordance with a motor revolution speed. A drive state of sub pump SP is drivingly controlled by a control unit CU1. Control unit CU1 is connected to a vehicle speed sensor VSS and a steering speed sensor SS and drivingly controls electric motor M in accordance with the detected sensor signals. Main pump MP and sub pump SP suck oil reserved in reservoir tank RST and oil is supplied to power steering system 1 to generate an assistance force. Reservoir tank RST includes a first tank RST1 coupled to main pump MP and main valve unit MVU and a second tank RST2 coupled to sub pump SP and sub valve unit SVU. These first tank RST1 and second tank RST2 are partitioned by means of a partitioning wall R1 formed within reservoir tank RST. However, oil is delivered to both tanks of first tank and second tank RST1, RST2 at an upper portion of partitioning wall R1 of reservoir tank RST. Thus, if oil is leaked from either one of first and second tanks RST1, RST2, oil quantity corresponding to a height of partitioning wall R1 can be secured by the other tank.

First tank RST1 is coupled to main pump MP via a first return passage 501 and oil discharged from main pump MP is supplied to suction port 301 of main valve unit MVU via a first drain oil passage 502. In addition, first tank RST1 and exhaust port 401 of main valve unit MVU are coupled together via a first exhaust oil passage 503. Second tank RST2 and sub pump SP are coupled together via a second suction passage 504. Oil discharged from sub pump SP is supplied via a second drain oil passage 505 to suction port 302 of sub valve unit SVU. Second tank RST2 and exhaust port 402 of sub valve unit SVU are coupled together via a second return passage 506. An oil passage 310 is coupled between supply port 303 of main valve unit MVU and control valve 600. An introduction port 403 of main valve unit MVU and control valve 600 are coupled together via a valve side return passage 410. Similarly, a supply port 304 of sub valve unit SVU and control valve 600 are coupled by means of an oil passage 310. An introduction port 404 of sub valve unit SVU and control valve 600 are connected via valve side return passage 410. Main valve unit MVU and sub valve unit SVU include a main side interruption state detection sensor SW1 and sub side interruption state detection sensor SW2 both detecting electrically detecting an interruption state of the corresponding valve. On or off signal of these interruption state detection sensors SW1 and SW2 are transmitted to control unit CU1. When the interruption states are detected in a state where both pumps are actuated, control unit CU1 recognizes that an abnormality occurs and illuminates a failure lamp or so forth (not shown) to inform the driver of the interruption state. In addition, a liquid quantity sensor RS is disposed in second tank RST2 of reservoir tanks at a height position lower than partitioning wall R1 and transmits a signal of whether an oil surface is lower than a height of liquid quantity sensor RS (namely, whether the liquid quantity of second reservoir tank RST2 is smaller than a predetermined quantity) to control unit Cu1.

[Structure of Valve Units]

A structure of each of main and sub valve units will hereinafter be described below.

Figure 5:
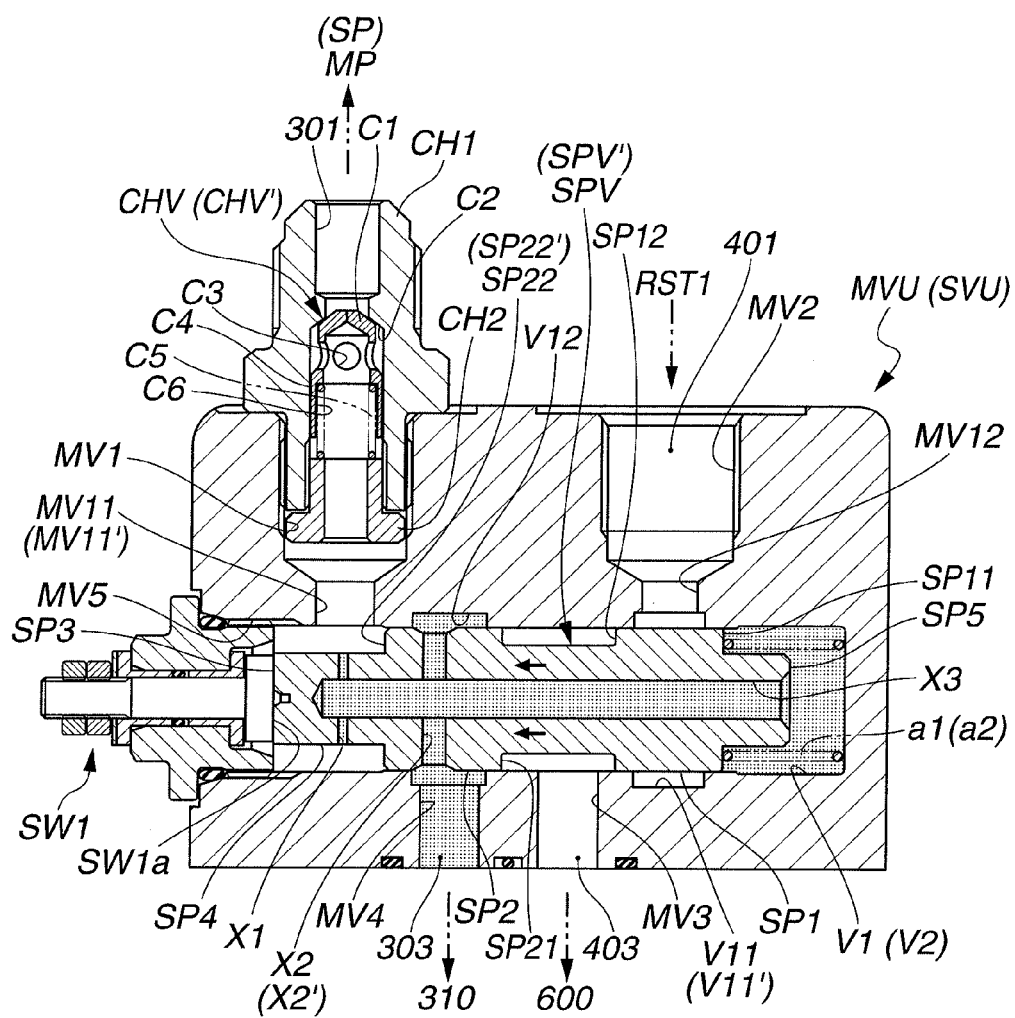
FIG. 5 is a cross sectional view representing a structure of a valve unit when a pump hydraulic pressure in the valve unit in the power steering system of the first preferred embodiment according to the present invention is developed.
Figure 6:
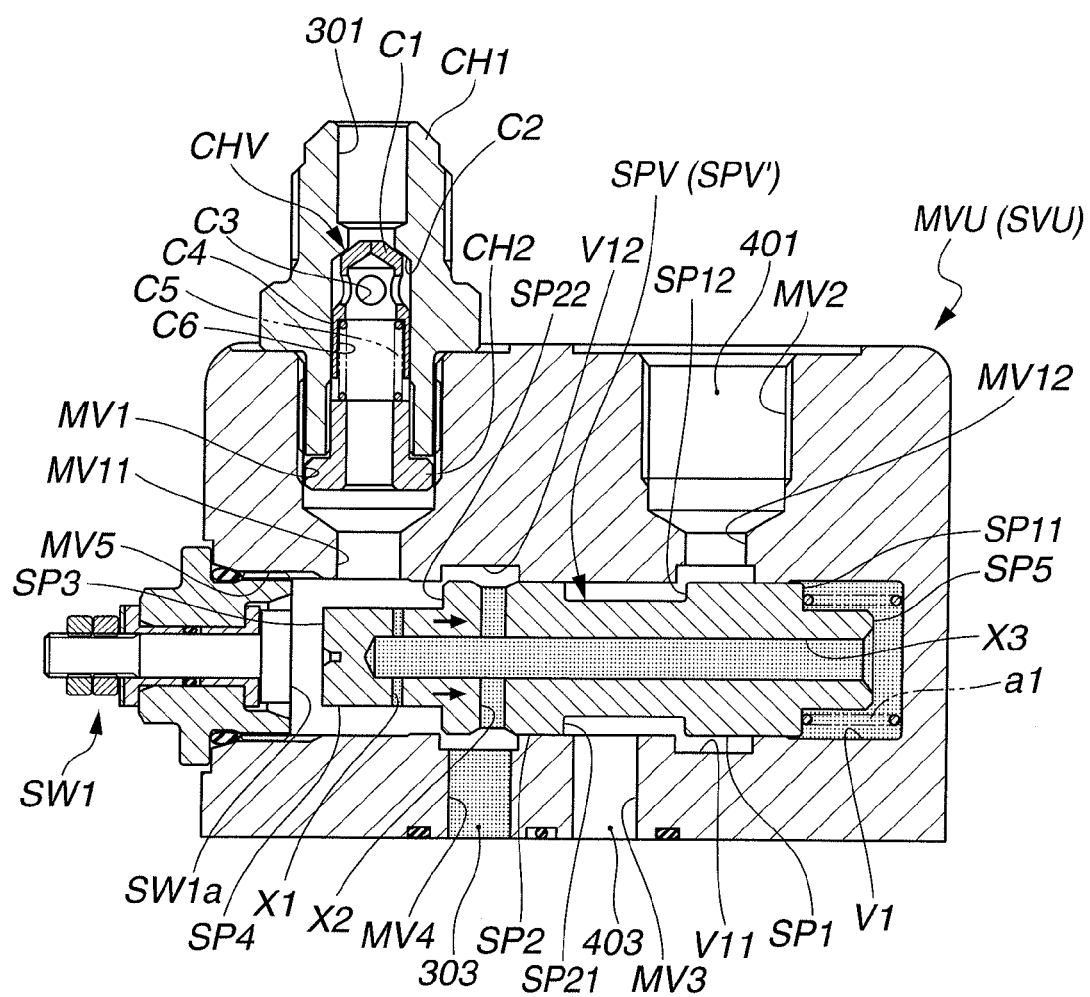
FIG. 6 is a cross sectional view representing a structure of the valve unit when the pump hydraulic pressure in the valve unit in the power steering system of the first preferred embodiment according to the pressure invention is not developed.

FIG. 5 shows a cross sectional view representing the structure of main valve unit MVU in the first embodiment when a pump hydraulic pressure is not developed in main valve unit MVU. FIG. 6 shows a cross sectional view representing the structure of main valve unit MVU when the pump hydraulic pressure is developed in main valve unit MVU. It should be noted that main valve unit MVU and sub valve unit SVU are basically the same structure but a destination of connection (coupling) of each of main valve unit MVU and sub valve unit SVU is merely different and, representatively, only main valve MVU will be described below.

Main valve unit MVU is formed with: a check valve attachment hole MV1 to which a check valve mechanism is attached; an exhaust port attachment hole MV2 to which exhaust port 401 is attached; an introduction oil passage MV3 coupled to introduction port 303; a supply oil passage MV4 coupled to supply port 303; a sensor attachment hole MV5 to which a main side interruption state detection sensor SW1 is attached; and a valve housing hole V1 which houses a main spool valve SPV (corresponds to a first switching valve). It should be noted that a sub spool valve SPV' (corresponds to a second switching valve) is housed within a valve housing hole V2 (not shown) in sub valve unit SVU.

The check valve mechanism includes: a check valve member CH1 having a housing axle hole c6 housing slidably an annular valve member CHV at an inside thereof. This check valve mechanism is attached onto main valve unit MVU in a state in which a plug CH2 holding a return spring c5 is attached onto this check valve member CH1. A valve member CHV includes a cylindrical section c4 which houses a return spring c5 at an inner side and which is slidably contacted on housing axle hole c6, a flow passage constituting section c3 whose diameter is smaller is than the cylindrical section (c4) and on an outer periphery of which a plurality of penetrating holes are formed, and a tip section c1 in a tapered shape and which is contacted on a sheet to enable a closure of the oil passage. A cone-shaped sheet surface c2 which is contacted on tip section C1 is formed on an upper end portion of housing axle hole c6 and an upstream side supply passage opening section MV11 connected to valve housing hole V1 is formed on the lower end section.

In addition, an oil passage MV12 coupled to valve housing hole V1 is formed on a lower end section of exhaust port attachment hole MV2. A valve housing hole V1 includes a supply port V12 formed at a position coupled to supply oil passage MV4 whose diameter of an inner periphery of valve housing hole V1 is enlarged and an introduction port (a downstream side supply passage opening section) V11 formed at a position coupled to oil passage MV4 whose diameter of the inner periphery of valve housing hole V1 is enlarged. Spool valve SPV is formed with a small-diameter axle section SP4 and first spool SP1 and second spool SP2 having approximately the same diameter as an inner periphery of valve housing hole V1 and whose diameters are larger than axle section SP4. An orifice X1 is penetrated in a radial direction of a contact section SP3 of axle section SP4. A pressure introduction passage X2 having a larger diameter than orifice X1 radially fitted to second spool SP2. The axle center section of axle section SP4 is formed with an axle hole X3 which communicates between orifice X1 and downstream side pressure introduction passage X2 and with a spool lower end side SP5. A return spring a1 is disposed within a low pressure chamber (a first other side pressure chamber) closed by means of a spool lower end SP5 and low pressure chamber side land section SP11. It should be noted that a return spring a2 (not shown) is disposed in the same way as return spring a1 in the case of sub valve unit SVU.

Return spring a1 is contacted on a low pressure chamber side land section SP11 of first spool SP1 and biases with a predetermined set weight in a left side direction in FIG. 5. It should be noted that a position of a spool valve SPV in FIG. 5 is set as an initial position. At this time, introduction port V11 is closed with a part of an outer periphery of first spool SP1 located between low pressure chamber side land section SP11 of first spool SP1 and upper end land section SP12 thereof. In addition, an introduction oil passage MV3 is opened between a lower end side land 21 of second spool SP2 and an upper end side land SP12. In other words, introduction oil passage MV3 is set in an interrupted state from suction port 301, supply port 303, and exhaust port 401, at an initial position of spool valve SPV. A downstream side pressure introduction passage X2 formed within second spool SP2 is closed within supply port V12 at the initial position of spool valve SPV so as to be coupled with supply oil passage MV4 and supply port 303. An axle section SP4 located at a more upper end side than second spool SP2 is disposed within a high pressure chamber (a first one side pressure chamber) closed with a supply passage side land section SP22 of second spool SP2. In addition, main side interruption state detection sensor SW1 detects that spool valve SPV is in the initial position, namely, in the interrupted state when this sensor is contacted on contact section SP3 of axle section SP4 and detects that the pump is being in a pump actuation state when main spool valve SPV is stroked so that main side interruption state detection sensor SW1 is not contacted on contact section SP3

Next, an operation of spool valve SPV will be described below. When the hydraulic pressure is drained from main pump MP, valve member CHV of the check valve mechanism is pressed from suction port 301 in a downward direction so that oil passes from a penetrating hole of oil passage constituting section c3 through an inner side of cylindrical section c4 so as to be introduced into a high pressure chamber (a first one side pressure chamber) closed by a supply passage side land section within valve storing hole V1. At this time, when supply passage side land section 22 is pressed and is in excess of the spring set weight of return spring a1, spool valve SPV is stroked toward a right side of FIG. 6. At this time, the working oil supplied within a low pressure chamber (a first other side pressure chamber) which is a lower end side of spool valve SPV is supplied as a hydraulic pressure (a first one side pressure chamber) lower than the upper end side by means of an orifice effect (a pressure reduction effect). This pressure difference strokes spool valve SPV so that supply passage side land section SP22 is exposed within supply port V12. Thus, in a state in which a variable orifice is constituted, upstream side supply passage opening section MV11 is communicated with supply oil passage MV4 to form a downstream side supply passage opening section. Thus. introduction passage (upstream side supply passage) opening section MV11 is communicated with oil passage MV21. Thus, a pump hydraulic pressure is supplied to a control valve 600 and unnecessary oil is exhausted to a reservoir tank side. Main side interruption state detection signal sensor SW1 outputs a signal indicating a pump actuation state.

When, in this state, an operation of main pump MP is stopped or a pump drain flow quantity (rate) cannot be secured, a flow quantity is reduced. Thus, an orifice effect (a pressure reduction effect) by means of orifice X1 cannot be obtained. Thus, equal pressures to upper end side spool SP22 and lower end side spool SP11 are acted so that spool valve SPV is returned to an initial position according to the set weight of return spring a1. Thus, main side interruption state detection sensor SW1 receives a power supply and outputs a signal indicating the interruption state due to the pump non-actuation state. It should be noted that the flow passage continued from oil passage MV4→downstream side pressure introduction passage X2→axle hole X3→orifice X1 is interrupted between main pump MP and oil passage MV4 by means of a check valve mechanism so as to prevent a reverse flow from control valve 600.

Power steering system in the first embodiment includes the valve units installed between main pump MP and control valve 600 and between sub pump SP and control valve 600. That is to say, main valve unit MVU configured to switch the communication and the interruption of the working liquid between main pump MP and control valve 600 and sub valve unit SVU configured to switch the communication and the interruption of the working liquid between sub pump SP and control valve 600. Sub valve unit SVU is formed to enable the selection between the communication state of sub valve unit SVU and the interruption state thereof when main valve unit MVU is in the communication state.

That is to say, for example, when the working liquid is supplied by sub pump SP in a state in which main pump MP does not supply the working liquid, the steering assistance can continuously be performed during a failure of main pump MP.

Figure 7:
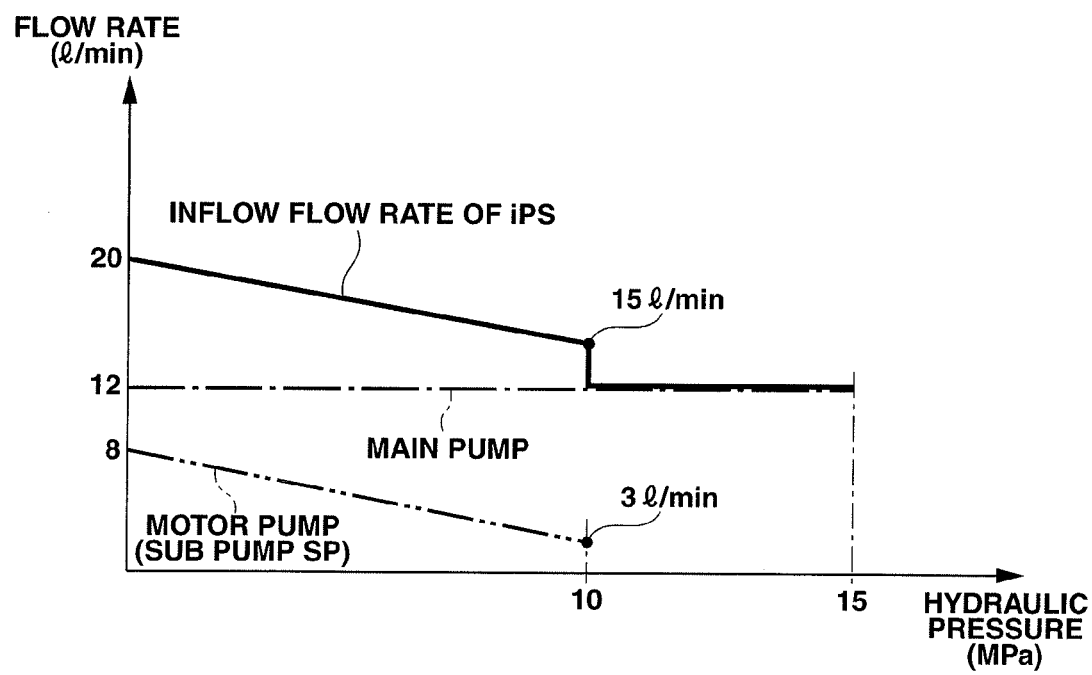
FIG. 7 is a characteristic graph representing a relationship between the hydraulic pressure and a liquid quantity (a flow rate) when both of the main pump and the sub pump are actuated (a solid line) in the power steering system of the first preferred embodiment, when only the main pump is actuated (a dot-and-dash line), and when only sub pump SP is actuated (a dot-dot-and-dash line).

In addition, sub pump SP supplies the working liquid in a state in which main pump MP supplies the working liquid. FIG. 7 shows a characteristic graph representing the hydraulic pressure and the liquid quantity (namely, flow rate) when each and both of the main pump and the sub pump is actuated in the power steering system in the first preferred embodiment. The reason that the reduction of discharge quantity of sub pump SP with respect to the hydraulic pressure is caused by a motor characteristic such that, when a motor load is increased, the number of revolutions per time is reduced since a size of electric motor M is extremely small-sized as small as possible. That is to say, since main pump MP is, at all times, actuated by means of engine ENG. The natural drain quantity at this time is supposed to, for example, 12 l/min. A predetermined flow quantity to compensate for an insufficient drain quantity is drained in sub pump SP which is a motor pump. Thus, the natural drain quantity of main pump MP can be reduced and a drive load of main pump MP is reduced so that an energy saving effect can be improved in a state in which a required flow quantity in such a case as a straight run is small.

Figure 8:
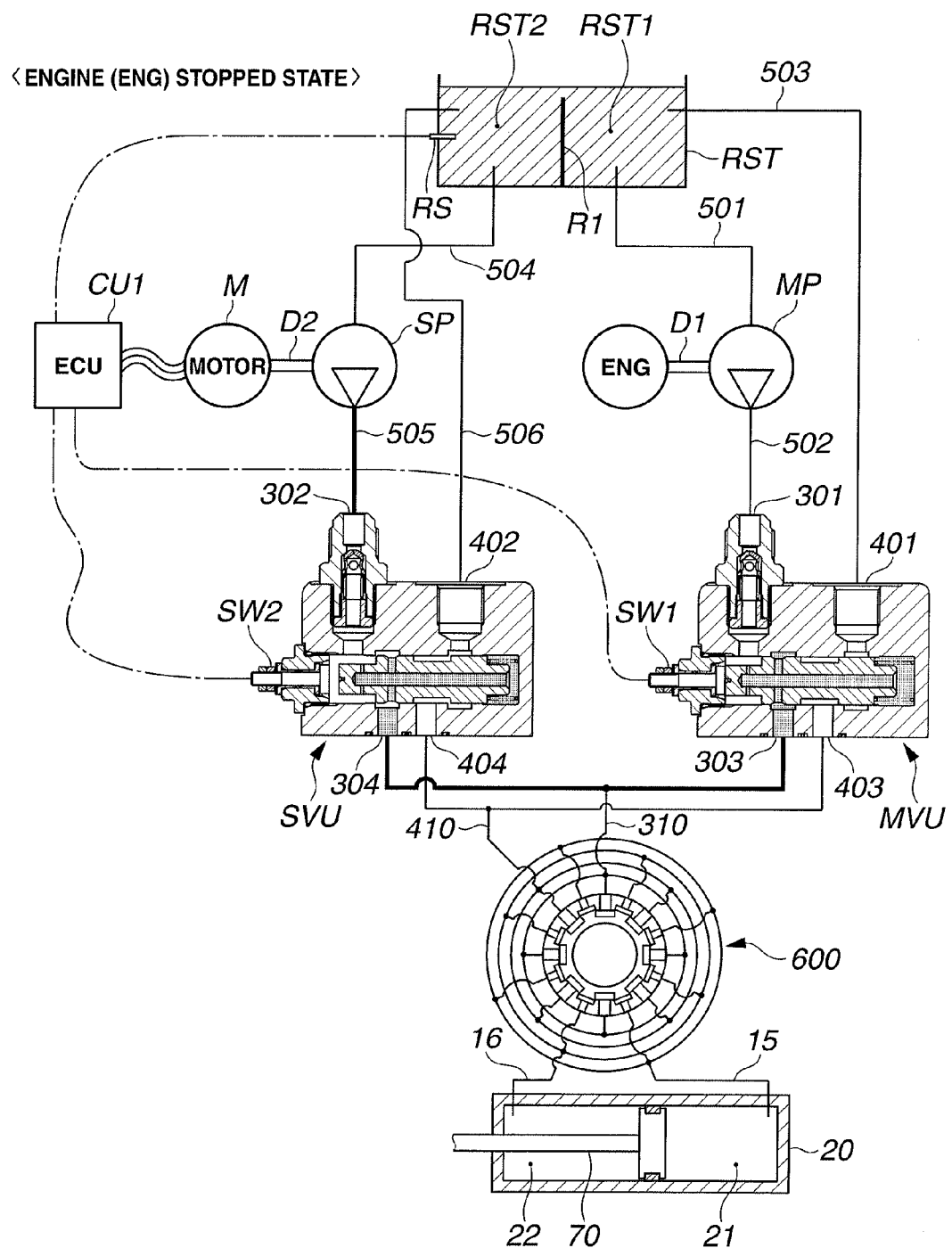
FIG. 8 is a system configuration view representing a state in which an engine actuation is stopped and only a sub pump is actuated to supply a working hydraulic pressure in the power steering system in the first preferred embodiment according to the present invention.

FIG. 8 shows a system configuration view representing a state in which the working hydraulic pressure is supplied with only sub pump SP actuated and engine ENG stopped, in the power steering system in the first embodiment.

In the state in which engine ENG is stopped, the drain flow quantity (rate) from main pump MP cannot be obtained. Hence, the supply of the working oil is carried out with sub pump SP driven. At this time, the reverse flow of the working oil drained from sub pump SP toward the main pump can be prevented by means of the check valve mechanism of main valve unit MVU.

Figure 9:
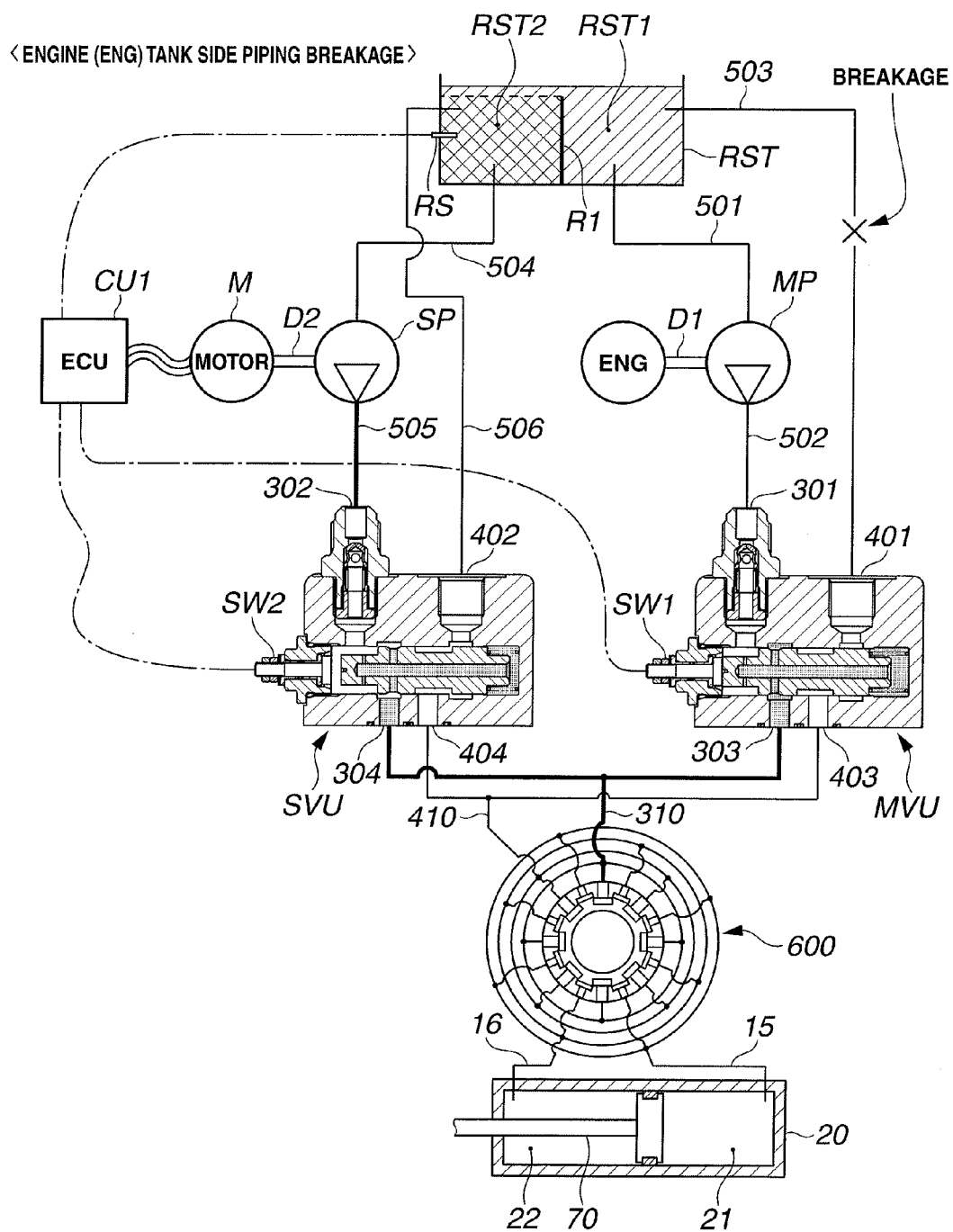
FIG. 9 is a system configuration view representing a state in which a first exhaust oil passage is broken in the power steering apparatus in the first preferred embodiment according to the present invention.

FIG. 9 shows a system configuration view representing a state in which first exhaust oil passage 503 is broken in the power steering system in the first embodiment. At this time, since the working liquid is leaked from first exhaust oil passage 503, the working liquid within first tank RST1 is eliminated. However, since partitioning wall R1 causes the working liquid within second tank RST2 to be secured, the assistance force only by means of sub pump SP can be obtained. It should be noted that, since the flow quantity to be drained is not present even though main pump MP is driven, when the working liquid is not present within first tank RST1, spool valve SPV within main valve unit MVU indicates the interruption state. Hence, even if the working liquid is caused to flow into introduction port 403, the communication for the other passage is interrupted by means of spool valve SPV. In addition, even if the working liquid from sub pump SP is caused to flow into supply port 303, the flow out of braking liquid into main pump MP can be avoided by means of the check valve mechanism. Thus, the further leak of working liquid equal to or larger than working liquid within first tank RST1 can be avoided.

Figure 10:
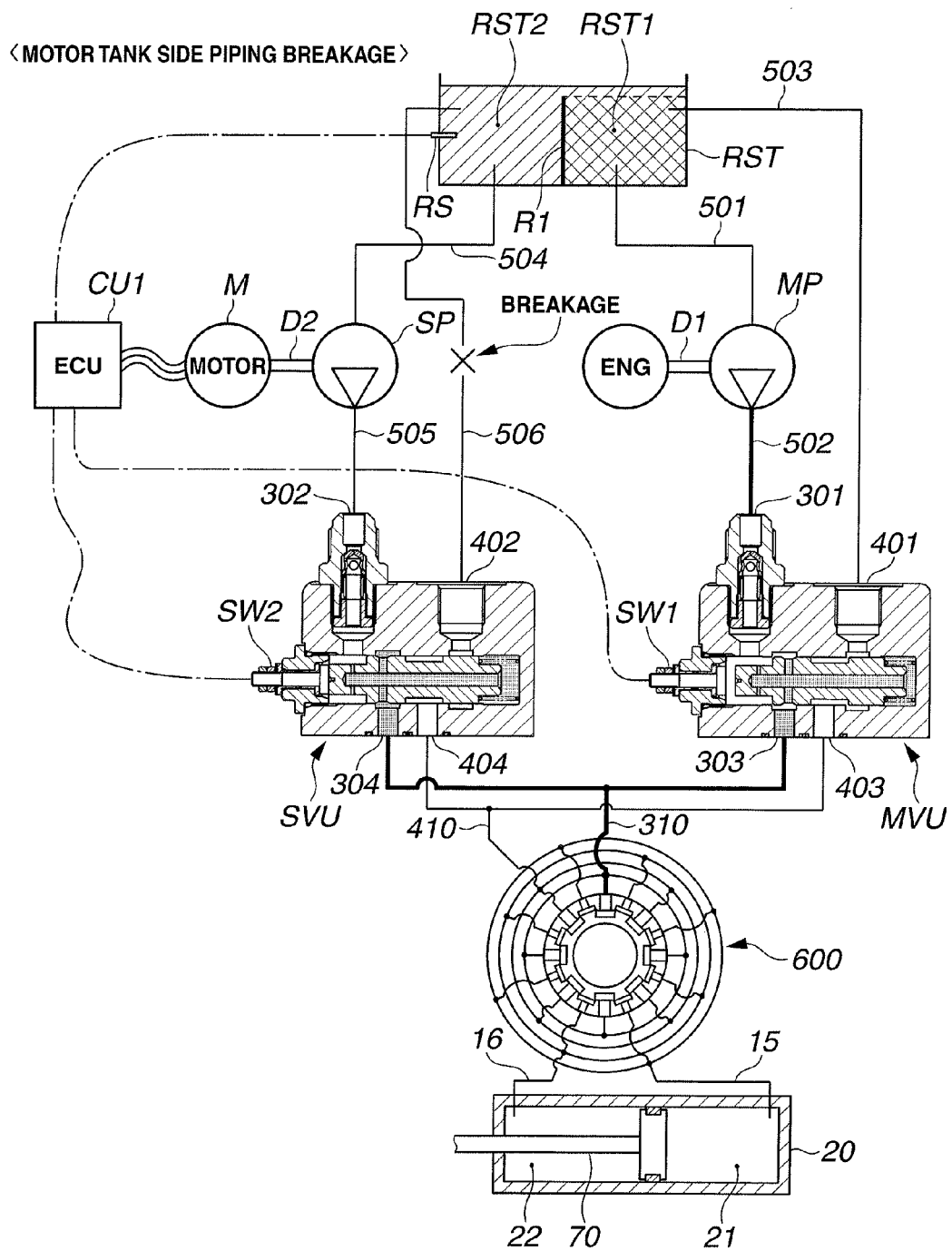
FIG. 10 is a system configuration view representing a state in which a second exhaust oil passage is broken in the power steering apparatus in the first preferred embodiment according to the present invention.

FIG. 10 shows a system configuration view representing a state in which second exhaust oil passage 506 is broken in the power steering system in the first embodiment. When the second exhaust oil passage, namely, second return passage 506 is broken, an oil surface within second tank RST2 is reduced. When liquid quantity sensor RS detects a reduction in the oil surface, control unit CU1 determines the occurrence of the leakage of working liquid and stops the actuation of sub pump SP. At this time, since spool valve SPV within sub valve unit SVU is interrupted from another passage, the leakage of working liquid does not occur any more. It should be noted that, since the connection position between second return passage 506 and second tank RST2 is located at a higher position than liquid quantity sensor RS of second tank RST2, a natural leakage such that the further leakage from a breakage section occurs via second return passage 506 can be avoided. In other words, the reason that liquid quantity sensor RS is installed only in second tank RST2 is as follows. That is to say, if the drop in oil surface within first tank RST1 were detected, the driving of engine ENG would not be stopped and there is no way of coping with the leakage of working oil. It is discussed that, in a case where a clutch is installed, the clutch is separated to stop the actuation of main pump MP.

[Driving Control for Sub Pump]

Next, a control processing of the sub pump will be described. Steering speed sensor SS is provided which detects steering speed ($\omega$) of the driver through the steering wheel. Specifically, as the steering speed becomes increased, the drained oil flow quantity becomes more necessary. Hence, the power supply quantity that is caused to flow into electric motor M is controlled so that the revolution speed of electric motor M is raised.

For example, the motor revolution speed may be controlled or a torque of electric motor may be controlled in accordance with the power supply quantity. It should be noted that the control of power supply quantity may be a control of an electric current supplied to the motor or a control of a duty ratio value in a PWM (Pulse Width is Modulation) control for electric motor M. Thus, it is not necessary to generate a wasteful drain flow quantity and it can contribute on the energy saving.

Figure 11:
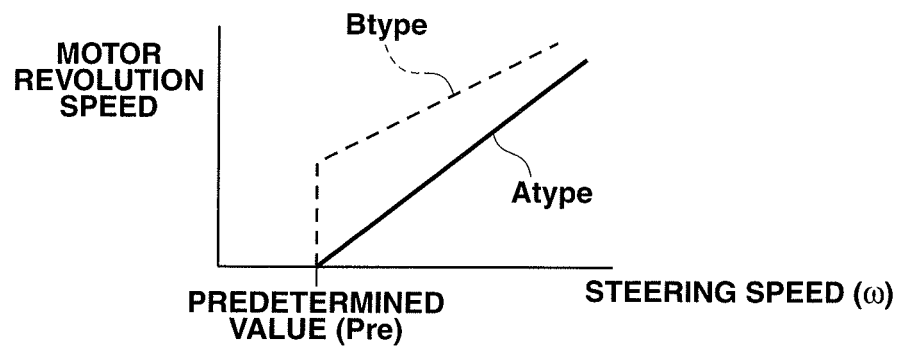
FIG. 11 is a characteristic graph representing a relationship between a steering speed and a motor speed in the first preferred embodiment according to the present invention.

In addition, the driving is stopped when the steering speed is smaller than the predetermined value. FIG. 11 is the characteristic graph representing the relationship between the steering speed and the motor revolution speed in the first preferred embodiment.

As steering speed SS is small (slow), the required flow quantity per unit time is small. Hence, the energy saving effect can be improved with the steering assistance only by means of main pump MP performed. A region in which steering speed ($\omega$) is smaller than predetermined value is a dead zone of electric motor M. Hence, a complexity of switching of drives and stops of electric motor M can be suppressed. In FIG. 11, A type is defined as the motor characteristic in which the motor revolution speed is gradually increased at a predetermined value (Pre) of steering speed (SS) and B type is defined as that in which the motor revolution speed is raised in a stepwise manner. Predetermined value (Pre) is defined as the steering speed which enables sufficiently the steering assistance only by means of main pump MP.

Figure 12:
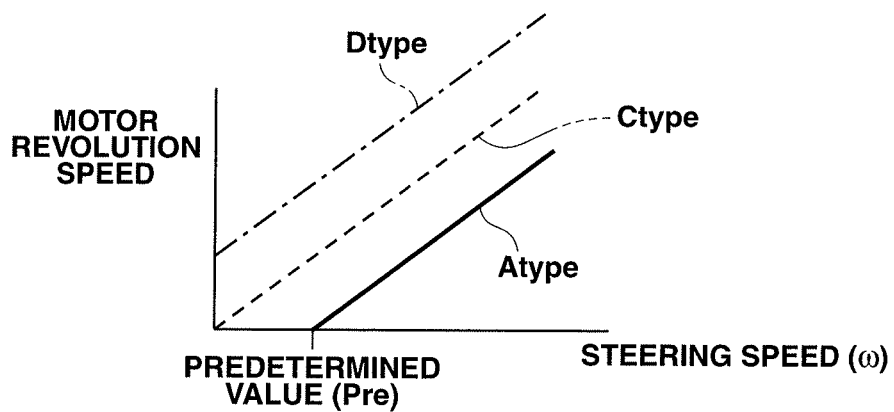
FIG. 12 is a characteristic graph representing a relationship between the steering speed and the motor speed in a first alternative to the first preferred embodiment according to the present invention.

It should be noted that, in the first embodiment, electric motor M is actuated when steering speed ($\omega$) is equal to or larger (faster) than predetermined value Pre. However, another structure may be adopted to the actuation of electric motor M. FIG. 12 shows a characteristic graph representing the relationship between the steering speed and the motor revolution speed in a first alternative to the first embodiment. As shown in C type in FIG. 12, the motor characteristic in which predetermined value SS may be set to 0 may be adopted and, as steering speed ($\omega$) may be started to be generated, the motor revolution speed may immediately be generated. In addition, as shown in D type in FIG. 12, the predetermined value (Pre) may be set to a minus value. Specifically, electric motor M may, at all times, be driven at a low revolution speed and, as steering speed ($\omega$) is increased, the motor revolution speed may gradually be increased in accordance with steering speed (ω). In this case, a high response characteristic can be obtained.

Figure 13A:
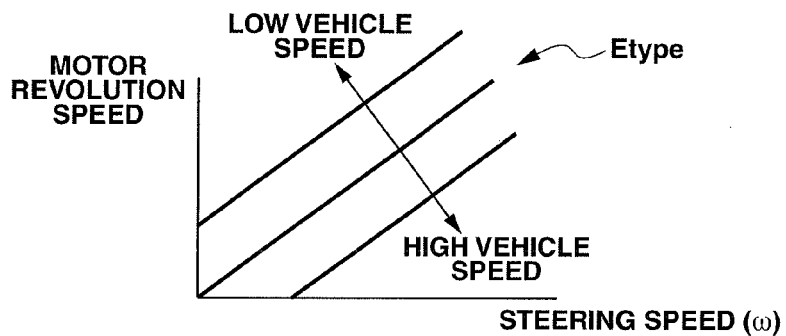
FIGS. 13A and 13B are characteristic graphs representing a relationship between the steering speed and the motor speed in a second alternative to the first preferred embodiment according to the present invention.
Figure 13B:
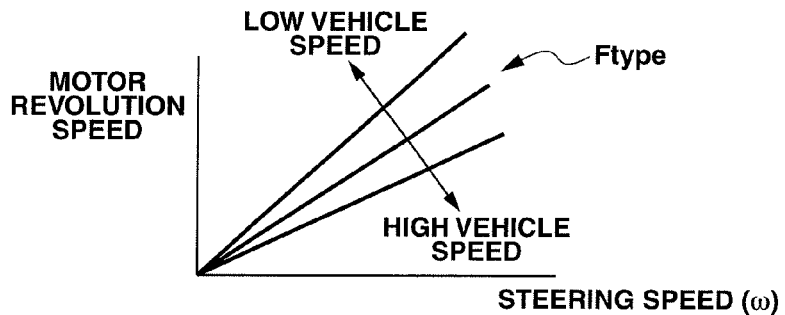

FIGS. 13A and 13B show characteristic graphs representing the relationship between the steering speed and the motor revolution speed in a second alternative to the first preferred embodiment according to the present invention. As shown in E type in FIG. 13A, vehicle speed VS is detected and, as vehicle speed VS becomes higher, no higher steering speed (ω) is generated. Hence, the motor revolution speed control may be carried out in the region in which the revolution speed of motor M is low and, as vehicle speed VS becomes lower, the motor revolution speed may be controlled to the higher motor revolution speed. It should be noted that, as in a case of E type in FIG. 13A, a type in which an offset value of the characteristic in accordance with the vehicle speed or a type in which a gradient of the characteristic in accordance with vehicle speed VS is modified is applicable.

Figure 14:
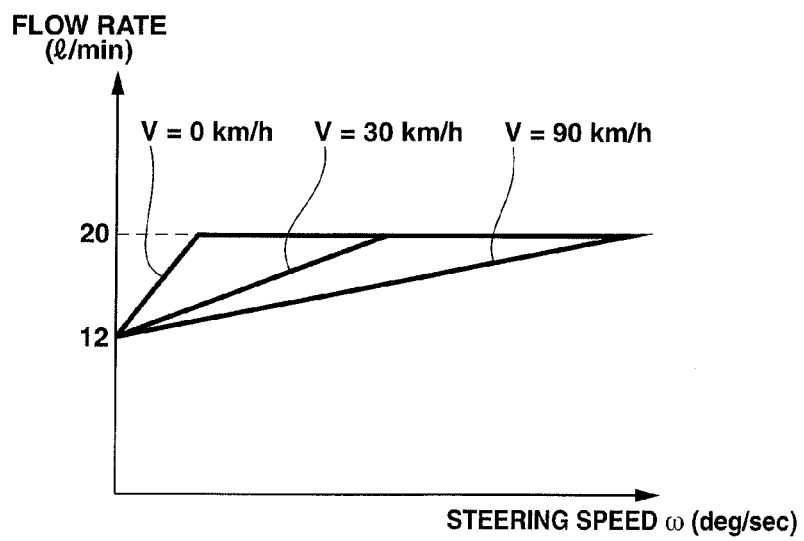
FIG. 14 is a characteristic graph representing a relationship between a steering speed and a pump draining flow rate in a case where a vehicle speed-sensitive type pump drive is carried out.

FIG. 14 shows the characteristic graph representing the relationship between the steering speed and the pump drained flow rate in a case where a vehicle speed responsive type pump drive is carried out. For example, when vehicle speed VS is 0 Km/h, the drained flow rate is increased in accordance with the rise in the steering speed at a relatively large gradient from the drained flow rate of the main pump. The characteristic of this vehicle speed responsive type can appropriately be used in combination with characteristic in FIG. 11 in the first embodiment so that a more precise control in accordance with the traveling state is possible.

As described above, the following actions and advantages can be obtained in the first embodiment.

(1) The power steering system in the first embodiment comprises: the power cylinder having first hydraulic pressure chamber 21 and second hydraulic pressure chamber 22 (hereinafter, also called a pair of pressure chambers) and configured to provide the steering force for at least one steered wheel on a basis of the pressure difference between the pair of pressure chambers; the steering mechanism operably turning the steered wheel in accordance with the rotational steering operation through the steering wheel; main pump MP (a first pump) having first drive shaft D1, configured to perform the suction and draining of the working liquid along with the revolution of first drive shaft D1 to supply working liquid to the power cylinder, and rotationally driven through engine ENG (first driving source); sub pump SP (a second pump) having second drive shaft D2 and configured to perform suction and draining of working liquid to supply working liquid to the power cylinder along with the revolution of second drive shaft D2; electric motor M to rotationally drive sub pump SP; control valve 600 to selectively supply the working liquid supplied from main pump MP or sub pump SP to the pair of pressure chambers of the power cylinder in accordance with the rotational steering operation of the steering wheel; main valve unit MVU (the first switching valve) disposed between main pump MP and control valve 600 to switch the communication and the interruption of working liquid between sub pump SP and control valve 600; and sub valve unit SVU (the second switching valve) disposed between sub pump SP and control valve 600 to switch the communication and interruption of the working liquid between sub pump SP and control valve 600, the sub valve unit (SVU) being selectably formed between the communication state and the interruption state, when main valve unit MVU is in a communication state.

Thus, the steering assistance can continuously be performed by the supply of the working liquid by the sub pump in a state in which main pump MP cannot supply the working liquid when, for example, main pump MP has failed. In addition, the natural (or intrinsic) drain quantity of main pump MP can be reduced by sub pump SP supplying the working liquid in a state in which main pump MP supplies the working liquid. Hence, the drive load of main pump MP can be reduced. Then, the energy saving effect can be improved in a state in which the required flow rate is small in such a case of the straight road run.

(2) The power steering system described above further comprises: first tank RST1 (a first reservoir tank) and second tank RST2 (a second reservoir tank) which are the pair of reservoir tanks RST which reserve the working liquid; valve side return passage 410 which connects between each of main valve unit MVU and sub valve unit SVU and control valve 600 and supplies the working liquid fed back from control valve 600 to either main valve unit MVU or sub valve unit SVU; first return passage 501 which connects between main valve unit MVU and first tank RST1 and feeds back the working liquid fed back to main valve unit MVU via valve side return passage 410 to first tank RST1; and second return passage 506 which connects between sub valve unit SVU and second tank RST2 and feeds back the working liquid fed back to sub valve unit SVU via valve side return passage 410, wherein main valve unit MVU sets the flow of a first return side which is a flow of working liquid from valve side return passage 501 in the communication state when a flow of working liquid between main pump MP and control valve 600 (hereinafter called, a first supply side flow) is in the communication state and sets the flow of the first return side in the interruption state when the flow of first supply side is in the interruption state and sub valve unit SVU sets a flow of a second return side which is a flow of working liquid from valve side return passage 410 to second return passage 506 in the communication state when a flow of working liquid between sub pump SP and control valve 600 (hereinafter called, a second supply side flow) is in the communication state and sets the flow of the second return side in the interruption state when the flow of second supply side is in the interruption state. Thus, the continuous steering assistance is possible by means of the other side even during the liquid leakage along with a circuit breakage (reservoir tank, passage, and so forth) at one side.

(3) The power steering system as described in item (2), wherein the power steering system further comprises liquid quantity sensor RS installed in second tank RST2 for detecting the liquid quantity of second tank RST2, wherein electric motor M is stopped when the liquid quantity of second tank RST2 detected by liquid quantity sensor RS is equal to or smaller than a predetermined quantity so that sub valve unit SVU sets the flow at is second supply side and the flow of second return side in the interruption state.

In a case where second return passage 506 is broken and the liquid quantity of second tank RST2 is decreased, electric motor M is stopped so that the leakage of working liquid from the breakage section can be suppressed. In addition, due to the interruption of sub valve unit SVU, the working liquid which is in a reverse flow can be prevented from being leaked from the breakage section. In addition, since the steering assistance can be continued through main pump MP.

(4) The power steering system as described in item (1), main valve unit MVU includes: main spool valve SPV (a first spool valve) disposed movably in the axis direction within first valve housing hole V1; return spring a1 (a first biasing member) disposed within first valve housing hole V1 to bias main spool valve SPV toward one side in the axial direction of main spool valve; the high pressure chamber (a first one side pressure chamber) disposed within first valve housing hole V1 and arranged in one side of the axial direction of main spool valve SPV; the low pressure chamber (a first one side pressure chamber) disposed within first valve housing hole V1 and arranged in the other end in the axial direction of main spool valve SPV; first upstream side supply passage opening section MV11 disposed within first valve housing hole V1 to be opened to the high pressure chamber (the first one side pressure chamber) to be communicated with main pump MP; a first downstream side supply passage opening section disposed to be opened to first valve housing hole V1 to be communicated with control valve 600; first supply passage side land section SP22 disposed in main spool valve SPV to interrupt the first downstream is side supply passage opening section with respect to the high pressure chamber (first one side pressure chamber) when main spool valve SPV is located at a most one side of the axial direction and formed to increase an opening area of the first downstream side supply passage opening section with respect to the high pressure chamber (first one side pressure chamber) as main spool valve SPV moves toward the other side of the axial direction thereof; and a first downstream side supply pressure introduction passage disposed for the low pressure chamber (first other side pressure chamber), at all times, to be communicated with control valve 600 and main spool valve SPV is controlled in accordance with the pressure difference before and after the first downstream side supply passage opening section which varies in accordance with a variation of flow rate of working liquid caused to flow through the first downstream side supply passage opening section variably controlled by means of first supply passage side land section 22.

A throttling area (an area of the downstream side supply passage opening section) of the passage connecting between main pump MP and control valve 600 is variably controlled in accordance with the flow rate of working liquid. Thus, a pressure loss at the throttling section can be reduced as compared with a case where this throttling area is fixed. In addition, since the spool valve is actuated in accordance with the variation of flow rate, main valve unit MVU can be set in the interruption state along with the stop of main pump MP even if the pressure at the control valve side is high as in the case of the steering operation.

On the other hand, in a case of the switching valve which switches between the communication and interruption on a basis of the pressure in the first pressure chamber, a responsive characteristic of main valve unit MVU to the interruption state is worsened even if main pump MP is stopped. Therefore, during the switching to the interruption state, the reverse flow of the supply pressure supplied from sub pump SP to main valve unit MVU cannot be interrupted by means of main valve unit MVU.

(5) The steering system as described in item (4), wherein sub valve unit SVU comprises: sub spool valve SPV' installed movably in the axial direction of sub spool valve SPV' within second valve housing hole V2; return spring a2 (second biasing member) disposed within second valve housing hole V2 to bias sub spool valve SPV' toward one side in the axial direction of sub spool valve SPV'; one low pressure chamber (second other side pressure chamber) disposed within second valve housing hole V2 and arranged at one side of the axial direction of sub spool valve SPV'; second upstream side supply passage opening section MV11' disposed within second valve housing hole V2 so as to be opened to low pressure chamber (second one side pressure chamber) and communicated with sub pump SP; the second downstream side supply passage opening section disposed so as to be opened to second valve housing hole V2 and to be communicated with control valve 600; second supply passage side land section SP22' disposed in sub spool valve SPV' to interrupt the second downstream side supply passage opening section with respect to the high pressure chamber (second one side pressure chamber) when sub spool valve SPV' is located at the most one side of the axial direction of sub spool valve SPV' and formed to increase the opening area of second downstream side supply passage opening section with respect to high pressure chamber (second one side pressure chamber) as sub spool valve SPV' moves toward the other side in the axial direction of sub spool valve SPV'; the second downstream side supply pressure introduction passage disposed for the low pressure chamber (second other side pressure chamber) to be at all times communicated with control valve 600; and sub side interruption state detection sensor SW2 configured to detect electrically that sub valve unit SVU is in the interruption state when sub spool valve SPV' (second spool valve) is located at a most one side of the axial direction, and wherein sub spool valve SPV' is controlled in accordance with the pressure difference before and after the second downstream side supply passage opening section which varies in accordance with the variation in the flow rate of working liquid caused to flow through second downstream side supply passage opening section which varies in accordance with second supply passage side land section SP22.

A switching responsive characteristic of sub valve unit SVU to the interruption state along with the stop of sub pump SP can be increased. Hence, the information of the interruption state by means of the interruption state detection sensor can be carried out at an earlier timing.

(6) The power steering system as described in item (4), the power steering system further comprises: a first check valve mechanism disposed between main pump MP and first upstream side supply passage opening section MV11 to allow the flow of working liquid only from the main pump side toward sub valve unit SVU direction; and a second check valve mechanism disposed between sub pump SP and second upstream side supply passage opening section MV11 to allow the flow of working liquid is only from sub pump side to sub valve unit SVU side direction. These check valve mechanisms prevent the reverse flow of working liquid from a drive side pump to a stop side pump. Hence, for example, in a case where the pump is stopped due to the breakage of the piping, the drain pressure of drive side pump is reversely streamed toward the pump side and such an event that working liquid leaks from the broken position can be prevented.

(7) The power steering system as described in item (4), wherein the power steering system further comprises contact section SP3 disposed in main valve unit MVU and on which one side of the axial direction of main spool valve SPV is contacted when main spool valve SPV is located at a most one side of the axial direction and a main side interruption state detection sensor SW1 which electrically detects that main valve unit MVU is in the interruption state when main spool valve SPV is contacted on contact section SP3.

Hence, main side interruption state detection sensor SW1 can inform the driver of the interruption state. In addition, since main side interruption state detection sensor SW1 is arranged in the one side in the axial direction of main spool valve SPV, an appropriate interruption state detection can be achieved even if main valve unit MVU is the switching valve in which the throttling area of the throttle passage is variably controlled. It should be noted that the same advantage can be obtained when the same structure as this sensor is mounted as a sub side interruption state detection sensor SW2 within sub valve unit SVU.

(8) The power steering system as described in item (1), wherein the power steering system further includes orifice X1 and axle hole X3 (a first throttling passage) disposed in main spool valve SP to at all times communicate between high pressure chamber (first one side pressure chamber) and low pressure chamber (first other side pressure chamber).

Since the pressure within high pressure chamber (first one side pressure chamber) is exhausted to low pressure chamber (first other side pressure chamber) via orifice X1 and axle hole X3 (first throttling passage), an interruption failure due to a closure of pressure within the high pressure chamber can be suppressed. In addition, since the throttling passage is formed by orifice X1, the pressure difference between the high pressure chamber and the low pressure chamber can be maintained and the flow rate control of main valve unit MVU can be performed.

(9) The power steering system as described in item (1), wherein a power supply turning on quantity caused to flow into electric motor M which is the second driving source is controlled in accordance with the steering speed.

As the steering speed becomes higher, the higher flow rate becomes needed. Hence, the required flow rate can be assured by controlling the power supply turning in quantity such that a revolution speed of electric motor M is raised. It should, herein, be noted that the electric motor is such that its control method is identified if the power supply quantity of electric motor is controlled and, for example, the torque of electric motor M which generates in accordance with the power supply quantity may be controlled. In addition, the control of the power supply quantity may be based on the current value or may be based on a duty ratio value in the PWM control.

(10) The power steering system as described in item (9), wherein electric motor M which is the second driving source is stopped when the steering speed is smaller than a predetermined value.

When the steering speed is small, the required flow rate per unit time is small. Thus, electric motor M is stopped. Hence, the steering assistance only through first driving source, namely, only through main pump MP is performed so that the energy saving effect can be improved. In addition, since a region in which the steering speed is smaller (slower) that the predetermined value provides a dead zone of electric motor M, a repetition complexity of switching between the drive and stop of electric motor M can be suppressed.

(11) The power steering system as described in item (9), wherein the power supply turning on quantity is caused to flow into electric motor M which is the second driving source is increased as the steering speed becomes higher.

Since electric motor M can drivingly be controlled in accordance with the increase in the required flow rate, the further energy saving can be achieved.

(12) The power steering system as described in item (9), wherein the power supply turning on quantity caused to flow into the electric motor which is the second driving source is controlled to be decreased as the vehicle speed becomes higher.

Since, as the vehicle speed (VS) becomes higher, the required flow rate is decreased, the electric motor can drivingly be controlled in accordance with the decrease in the required flow rate and the further energy saving can be achieved.

(13) The power steering system as described in item (1), wherein main valve unit MVU and sub valve unit SVU are configured to be in the communication state when working liquid is supplied from both of main pump MP and sub pump SP and main valve unit MVU or sub valve unit SVU is provided with interruption state detection sensor SW1, SW2 which electrically detects the interruption state of either main valve unit MVU or sub valve unit SVU.

The interruption state of each of main and sub valve units MVU, SVU means the stop of pump or leakage of drain pressure. In a case where the stop of pump (leakage of drain pressure) is detected and the stop of pump (leakage of the drain pressure), the abnormality of the system can be informed to the driver.

Second Embodiment

Figure 15A:
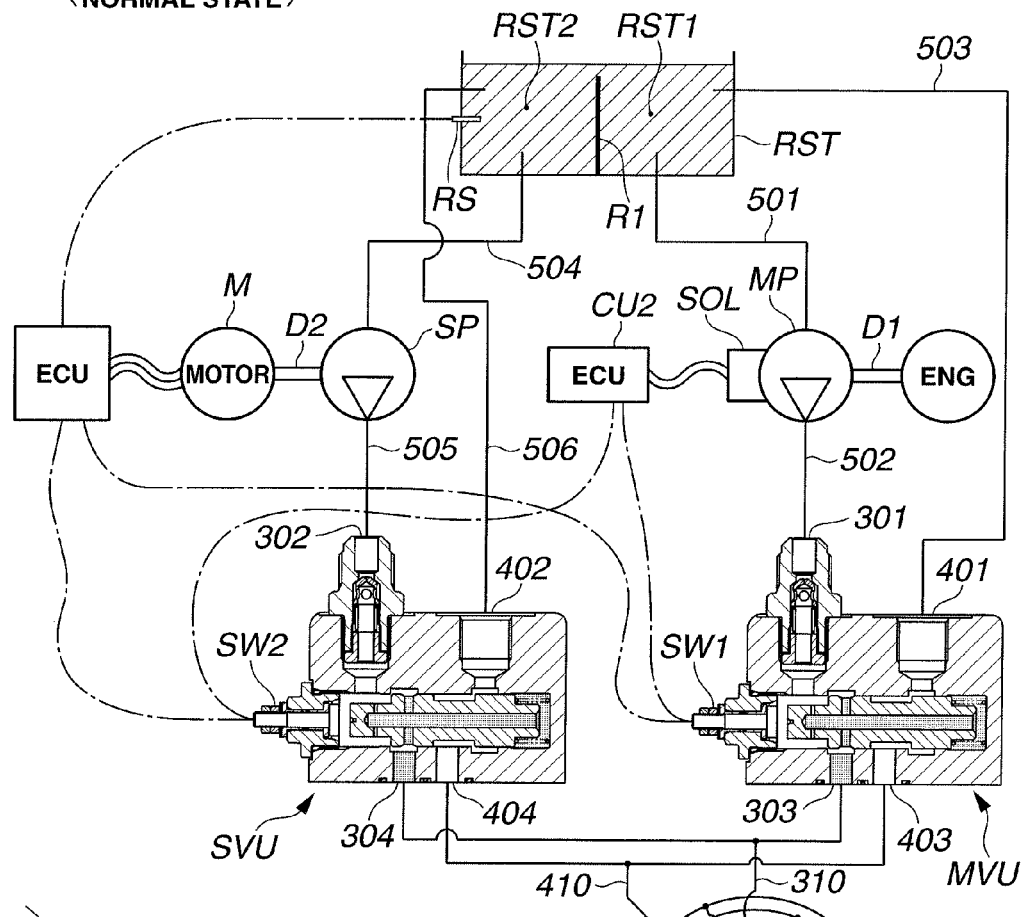
FIGS. 15A and 15B are a system configuration view of the power steering system in a second preferred embodiment according to the present invention and an expanded view of a main pump shown in FIG. 15A, respectively.
Figure 15B:
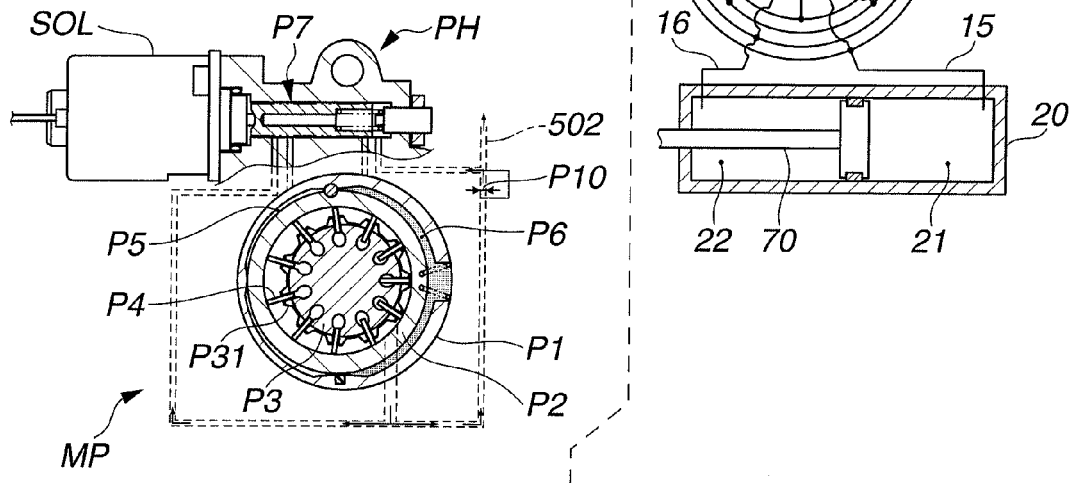

Next, a second preferred embodiment of the power steering system according to the present invention will, hereinafter, be described. FIG. 15A shows a system configuration view of the power steering system in the second embodiment and FIG. 15B shows an expanded view of main pump MP used in the second embodiment shown in FIG. 15A.

In the first embodiment, main pump MP is such that, when the drain (flow) quantity of main pump MP reaches to the preset natural (or intrinsic) drain quantity, the flow rate equal to or larger than the preset natural drain quantity is cut out. On the other hand, in the second embodiment, an electronically controlled variable displacement (capacity) pump is adopted in which the natural drain quantity is modifiable by means of electromagnetic valve SOL.

It should be noted that, although a command signal is outputted to electromagnetic valve SOL and electric motor M from separate control units as viewed from FIG. 15A, the command signal is outputted to the single control unit. The electronically control type variable displacement vane pump, as shown in FIG. 15B, includes: pump housing PH having pump element housing section P1 at the inside of housing PH; cam ring P2 disposed movably within pump element housing section P1 and formed in the ring shape; a rotor P3 disposed within cam ring P2, having a plurality of radially extended slits P31 disposed along a circumferential direction of rotor P3, and rotationally driven by means of first drive shaft D1; and vanes P4 advanceably or retractably (namely, movably) disposed along slits P31 of rotor P3 and forms a plurality of pump chambers together with cam ring P2 and rotor P3. In addition, this variable displacement vane pump in the second embodiment further includes: a first fluid pressure chamber P5 formed at one side of a pair of liquid chambers disposed between pump element housing section P1 and cam ring P2 at which a volume is decreased along with the increase in an eccentricity of cam ring P1 to drive shaft D1 and a second fluid pressure chamber P6 formed at one side of the pair of liquid chambers disposed between pump element housing section P1 and cam ring P2 at which the volume is increased along with the increase in an eccentricity of cam ring P1 to drive shaft D1. Furthermore, this variable displacement vane pump within pump housing PH further includes: a suction inlet which opens in a region of a plurality of pump chambers in which the volume is increased along with the revolution of the rotor; a suction passage communicated with the suction inlet; a drain outlet which opens in a region of the plurality of pump chambers in which the volume is decreased along with the revolution of the rotor; and a drain passage and communicated with the drain outlet. Furthermore, this variable displacement vane pump further includes: a control valve P7 disposed within pump housing PH to control the pressure of first fluid pressure chamber P5 by controlling the movement quantity (the displacement) of cam ring P2 according to a pressure difference between first fluid pressure chamber P5 and second fluid pressure chamber P6; and an electromagnetic valve SOL disposed within pump housing PH, controlled on a basis of the rotational operation of the steering wheel, and controlling a drain quantity per rotor revolution by controlling the displacement of cam ring P2. Furthermore, a metering orifice P10 is disposed in a drain flow passage.

If the flow in the pump occurs, the downstream side pressure decreased than the upstream side of metering orifice P10 is supplied to control valve 600 as the drain pressure.

The upstream side section and downstream side section of metering orifice P10 are connected to control valve P7. Control valve P7 controls the pressure supplied to first fluid pressure chamber P5 and second fluid pressure chamber P6 to maintain a pressure difference relationship set according to a predetermined spring set weight to control the eccentricity of cam ring P2. It should be noted that electromagnetic valve SOL is structured so that the biasing force can be provided which opposes against the spring set weight of control valve P7 and, thus, the drain flow quantity is modifiable by controlling the spring set weight to the desired set weight.

Since main pump MP is engine driven, main pump MP is at all times rotationally driven during the engine driving and the revolution speed of main pump MP in accordance with the required flow rate cannot be performed. Hence, it is favorable from the viewpoint of is energy saving to use maximally the drained flow quantity from main pump MP irrespective of the increase or decrease in the required flow quantity. Thus, the drain quantity of main pump MP is set to be small so that a wasteful work of main pump MP is not carried out even if the required flow quantity is small. When the required flow quantity is large, an insufficient quantity according to the drive of main pump MP is compensated for by sub pump SP so that, while the pump load of main pump MP is reduced and the required flow quantity is secured, the energy saving can be achieved. In addition, since main pump MP is the electronic control type variable displacement (capacity) vane pump in which the natural drain quantity is variably controlled in accordance with the steering state, the further reduction of the pump load of main pump MP can be achieved.

Figure 16:
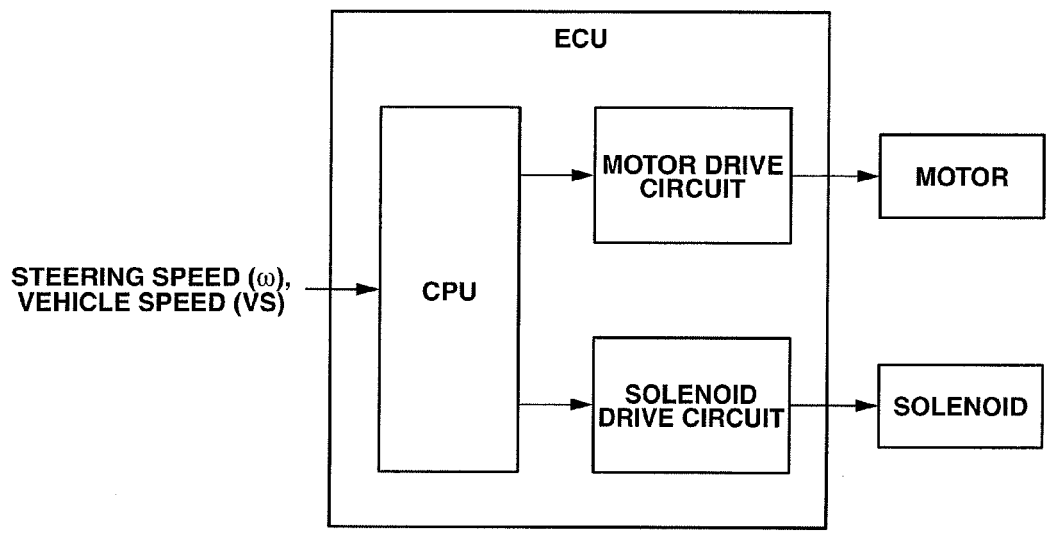
FIG. 16 is a rough view representing the system of the power steering system in the second preferred embodiment according to the present invention.

FIG. 16 shows a rough view representing the structure of the control unit in the second embodiment. The control unit is provided with a single chip CPU (which is an integrated circuit (IC)) to perform control and arithmetic operations of command signals when steering speed (ω) and vehicle speed (VS) signal is inputted. The control unit includes a motor drive circuit which outputs a drive current to electric motor M on a basis of the command signal calculated by chip CPU and a solenoid drive circuit which outputs the drive current to electromagnetic valve SOL. In addition, chip CPU includes a motor control program to control electric motor M and an electronic valve control program drivingly controlling electromagnetic valve SOL. As described above, since both of motor control program and electromagnetic valve control program are incorporated into single chip CPU, a cooperative (coordinate) control of both of motor drive and electromagnetic valve drive can easily be achieved.

As described hereinabove, the power steering system in the second preferred embodiment described above can achieve the following action and advantages.

(14) The power steering system (in the second embodiment) comprises: the power cylinder having the pair of first and second hydraulic pressure chambers 21, 22 (the pair of hydraulic pressure chambers) and configured to provide the steering force for the steered wheel on a basis of the pressure difference between the pair of pressure chambers; the steering mechanism which turns the steered wheel in accordance with the rotational steering operation of the steering wheel; pump housing PH having pump element housing section P1 at the inner side thereof; cam ring P2 movably mounted within the pump element housing section P1 and formed in the annular shape; first driving shaft D1 rotatably supported on pump housing P1 and to which the rotational driving force is transmitted from engine ENG of the vehicle which is the first driving source; rotor P3 rotationally driven by means of first driving shaft D1 and having the plurality of radially extended slits P31 disposed within cam ring P2 and arranged along the circumferential direction; vane P4 advanceably or retractably (namely, movably) disposed along slits P31 of rotor P3 to form the plurality of pump chambers together with cam ring P2 and rotor P3; suction inlet mounted within pump housing PH to be opened to the region of the plurality of pump chambers in each of which to the volume is increased along with the rotation of rotor P3 from among the plurality of pumps; the suction passage mounted within pump housing PH to be communicated with the suction inlet; the draining outlet mounted within pump housing PH to be opened to the region of the is plurality of pump chambers in each of which the volume is decreased along with the rotation of rotor P3 from among the plurality of pumps; the drain passage mounted within pump housing PH to be communicated with the suction inlet; fluid pressure chamber P5, P6 which are the pair of liquid chambers formed between pump element housing section P1 and cam ring P2, first fluid pressure chamber P5 being formed toward the side at which the volume is decreased along with the movement of cam ring P2 in the direction at which the volume is decreased in the direction in which the eccentricity of cam ring P2 with respect to drive axle D1 is increased and second fluid pressure chamber P6 being formed toward the side at which the volume is increased along with the movement of cam ring P2 in the direction at which the volume is decreased in the direction in which the eccentricity of cam ring P2 with respect to drive axle D1 is increased; main pump MP constituted by control valve P7 mounted within pump housing PH for controlling the movement quantity (displacement) of cam ring P2 according to the pressure difference between first fluid pressure P5 and second fluid pressure chamber P6 by controlling the pressure within first fluid pressure chamber P5; electromagnetic valve SOL mounted within pump housing PH controlled on a basis of the revolution operation of the steering wheel for controlling the drained quantity per revolution of the rotor by controlling the displacement of cam ring P2; sub pump SP for sucking and draining working liquid along with the revolution of second drive shaft D2 and which supplies from main pump MP or sub pump SP: electric motor M which is the driving source which is different from engine ENG and rotationally drives sub pump SP; control valve 600 having second drive shaft D2 and installed in the steering mechanism which selectively supplies working liquid to the power cylinder by sucking or draining working liquid along with the revolution of second drive shaft D2; and main valve unit MVU and sub valve unit (switching valve) SVU disposed from among main pump MP, sub pump SP, and control valve 600 for switching the communication and interruption of working liquid between main pump MP and control valve 600 and for switching the communication and the interruption of working fluid between sub pump SP and control valve 600.

Since main pump MP is engine driven, main pump MP is at all times rotationally driven during the engine driving and the revolution speed of main pump MP in accordance with the required flow rate cannot be performed. Hence, it is favorable from the viewpoint of the energy saving to use maximally the drained flow quantity from main pump MP irrespective of the increase or decrease in the required flow quantity. It should be noted that the drain quantity of main pump MP is set to be small so that a wasteful work of main pump MP is not carried out even if the required flow quantity is small and, when the required flow quantity is large, an insufficient quantity according to the drive of main pump MP is compensated for by sub pump SP so that, while the pump load of main pump MP is reduced and the required flow quantity is secured, the energy saving can be achieved. In addition, since main pump MP is the electronic control type variable displacement (capacity) vane pump in which the natural drain quantity is variably controlled in accordance with the steering state, the further reduction of the pump load of main pump MP can be achieved.

(15) The power steering system as described in item (14), the power steering system further comprises: the single chip CPU which is the integrated circuit; the electromagnetic valve control program stored in the chip CPU which drivingly controls electromagnetic valve SOL; and the motor control program stored in the chip CPU which drivingly controls electric motor M.

Since the respective control programs for electromagnetic valve SOL and electric motor M are stored in the same chip (or a microcomputer), the coordinate control of both of electromagnetic valve SOL and motor M becomes facilitated.

Third Embodiment

Figure 17:
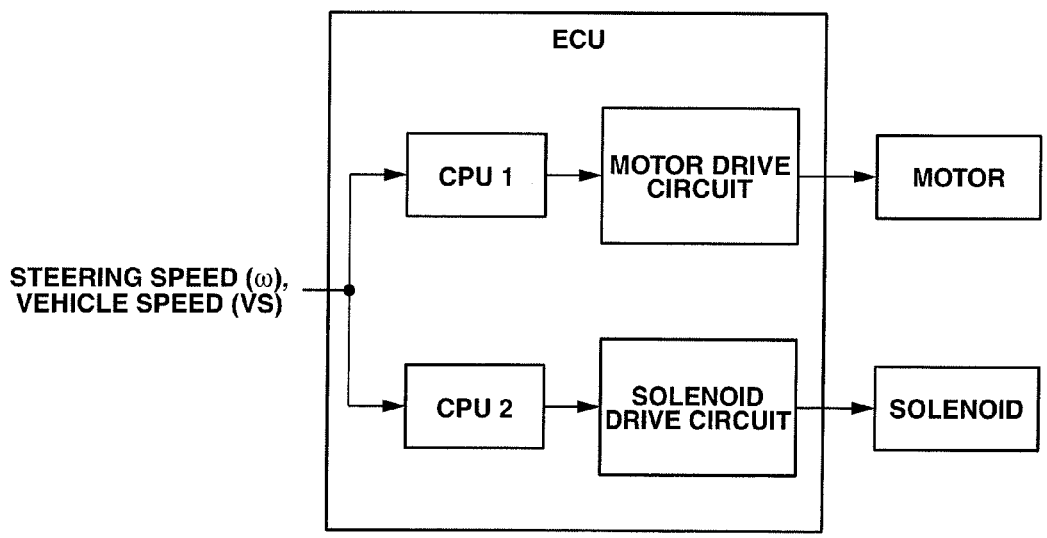
FIG. 17 is a rough view representing a structure of a control unit in a third preferred embodiment according to the present invention.
Figure 18:
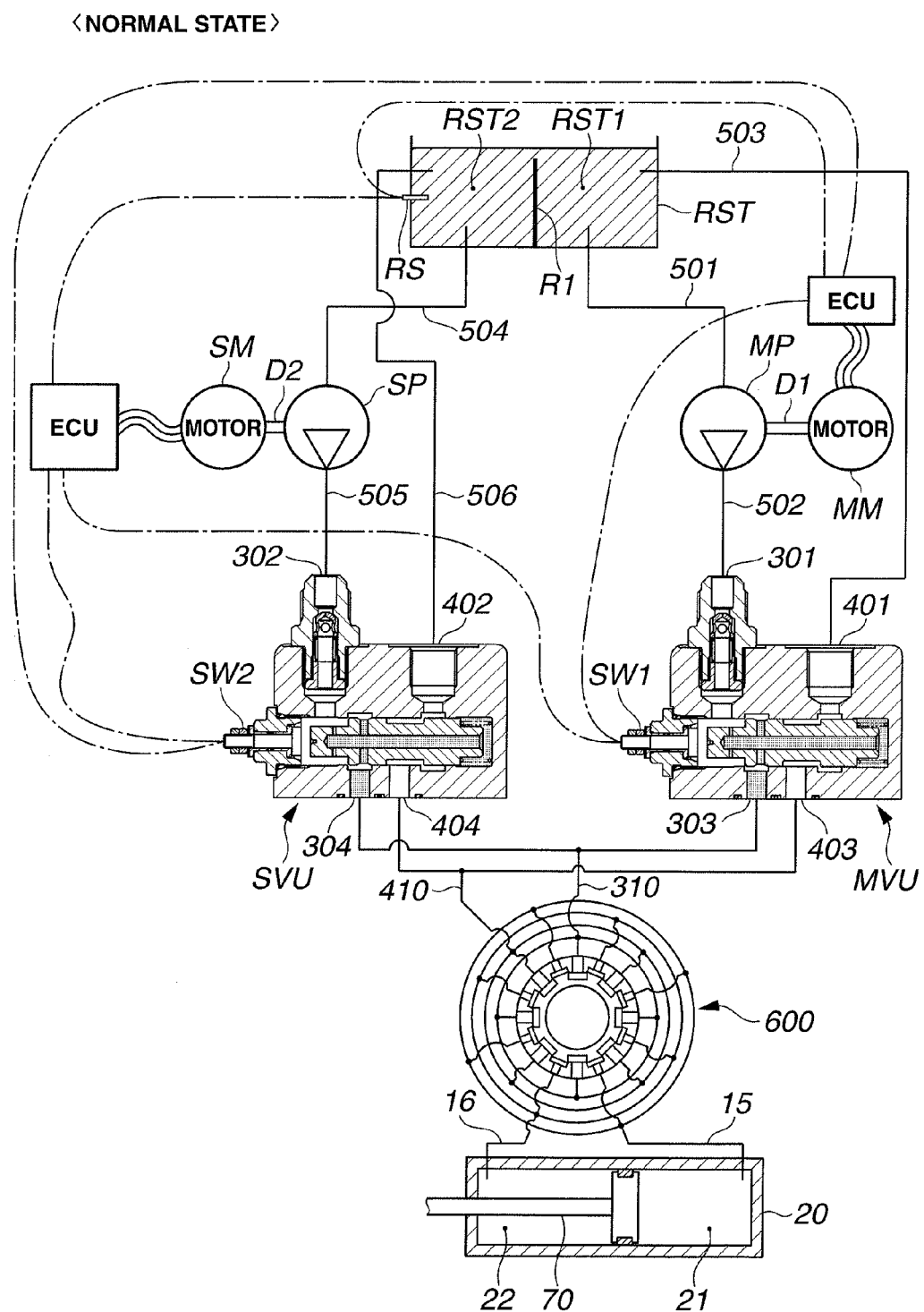
FIG. 18 is a rough view representing a system of the power steering system in a fourth preferred embodiment according to the present invention.

Next, a third preferred embodiment of the power steering system will be described below. FIG. 17 shows a rough view representing a structure of the control unit in the third embodiment according to the present invention. A basic structure of the power steering system in the third embodiment is the same as the second embodiment. The program for calculating a control command to electromagnetic valve SOL is stored in a first chip CPU1 and the program for calculating the control command to motor M is stored in a second chip CPU2. This is the difference point from the second embodiment. Thus, the steering assistance is continuously possible by means of one chip CPU if another chip becomes abnormal.

(16) The power steering system as described in item (14), the power steering system includes: the first chip; the electromagnetic valve control program stored in the first chip CPU to drivingly control electromagnetic valve SOL; the second chip CPU2 which is another integrated circuit than first chip CPU1; the motor control program stored in the second chip CPU2 to drivingly control electric motor M; and a frame housing both of the first chip CPU1 and second chip CPU2.

Thus, the steering assistance is possible continuously by another chip even if either one of first and second chip CPUs CPU1, CPU2 becomes abnormal.

Fourth Embodiment

Next, the power steering system of a fourth preferred embodiment according to the present invention will be described below. In each of the first, second, and third embodiments, an example in which, as main pump MP, a type which is at all times driven by engine ENG has been adopted. On the other hand, in the fourth embodiment, main pump MP is driven by means of main electric motor MM and sub motor SP is driven by means of sub electric motor SM. This is the difference point from each of the first, second, and third embodiments. In this way, even if a plurality of electric motors are provided, the same action and advantages as each of the first, second, and third embodiment can be obtained.

This application is based on a prior Japanese Patent Application No. 2010-288182 filed in Japan on Dec. 24, 2010. The entire contents of this Japanese Patent Application No. 2010-288182 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the to following claims.

What is claimed is:

1. A power steering system comprising:
a power cylinder equipped with a pair of pressure chambers to provide a steering force for at least one of steered wheels on a basis of a pressure difference between the pair of pressure cylinders;
a steering mechanism configured to turn the steered wheel in accordance with a rotational steering operation of a steering wheel;
a first pump equipped with a first drive shaft to suck and drain a working liquid along with a revolution of the first drive shaft to supply the working liquid to the power cylinder, the first pump being rotationally driven by means of a first driving source;
a second pump equipped with a second drive shaft to suck and drain the working liquid along with the revolution of the second drive shaft to supply the working liquid to the power cylinder;
a second driving source which is a driving source different from the first driving source, is constituted by an electric motor, and rotationally drives the second pump;
a control valve disposed in the steering mechanism to selectably supply the working liquid supplied from the first pump or second pump to the pair of pressure chambers in accordance with a rotational steering operation of the steering wheel;
a first switching valve disposed between the first pump and the control valve to switch a communication and an interruption of the working liquid between the first pump and the control valve; and
a second switching valve disposed between the second pump and the control valve to switch the communication and the interruption of the working liquid between the second pump and the control valve, a communication state and an interruption state being selectably formed in the second switching valve when the first switching valve is in the communication state.

2. The power steering system as claimed in claim 1, wherein the power steering system further comprises:
a pair of reservoir tanks constituted by a first reservoir tank and a second reservoir tank to reserve the working liquid;
a valve side return passage connected between each of the first switching valve and the second switching valve and the control valve and through which the working liquid fed back from the control valve is supplied to either the first switching valve or the second switching valve;
a first return passage connected between the first switching valve and the first reservoir tank and through which the working liquid fed back to the first switching valve via the valve side return passage is fed back to the first reservoir tank; and
a second return passage connected between the second switching valve and the second reservoir tank and through which the working liquid fed back to the second switching valve via the valve side return passage is fed back to the second reservoir tank,
wherein the first switching valve sets a flow of a first return side which is the flow of the working liquid from the valve side return passage to the first return passage to be in the communication state, when a flow of a first supply side which is the flow of the working liquid between the first pump and the control valve is set in the communication state, and sets the flow of the first return side to be in the interruption state, when the flow of the first supply side is set in the interruption state, and the second switching valve sets a flow of a second return side which is the flow of the working liquid from the valve side return passage to the second return passage to be in the communication state, when a flow of a second supply side which is the flow of the working liquid between the second pump and the control valve is set in the communication state, and sets the flow of the second return side to be in the interruption state, when the flow of the second supply side is set in the interruption state.

3. The power steering system as claimed in claim 2, wherein the power steering system further comprises a liquid quantity sensor disposed in the second reservoir tank to detect the liquid quantity of the second reservoir tank and wherein the second driving source stops a drive thereof, when the liquid quantity of the second reservoir tank detected by the liquid quantity sensor is equal to or smaller than a predetermined quantity, and the second switching valve sets the flow of the second supply side and the flow of the second return side to be set in the interruption state.

4. The power steering system as claimed in claim 1, wherein the first switching valve comprises:
   a first spool valve disposed to be axially movable within a first valve housing hole; a first biasing member disposed in the first valve housing hole to bias the first spool valve in one side of an axial direction of the first spool valve;
   a first one side pressure chamber disposed in the first valve housing hole and arranged at one side in the axial direction of the first spool valve;
   a first other side pressure chamber disposed in the first valve housing hole and arranged in the other side of the axial direction of the first spool valve;
   a first upstream side supply passage opening section disposed in the first valve housing hole to be opened toward the first one side pressure chamber and communicated with the first pump;
   a first downstream side supply passage opening section disposed to be opened toward the first valve housing hole and communicated with the control valve;
   a first supply passage side land section disposed in the first spool valve to interrupt the first downstream side supply passage opening section with respect to the first one side pressure chamber, when the first spool valve is located at most one side of the axial direction of the first spool valve, and formed in such a way that an opening area of the first downstream side supply passage opening section with respect to the first one side pressure chamber is increased as the first spool valve is moved toward the other side of the axial direction of the first spool valve; and
   a first downstream side supply pressure introduction passage disposed in such a way that the first other side pressure chamber is at all times communicated with the control valve,
   wherein the first spool valve is controlled in accordance with a pressure difference before and after the first downstream side supply passage opening section which is varied in accordance with a change in a flow rate of the working liquid caused to flow into the first downstream side supply passage opening section variably controlled in accordance with the first supply passage side land section.

5. The power steering system as claimed in claim 4, wherein the second switching valve comprises:
   a second spool valve disposed to be axially movable within a second valve housing hole;
   a second biasing member disposed in the second valve housing hole to bias the second spool valve toward one side in an axial direction of the second spool valve;
   a second one side pressure chamber disposed within the second valve housing hole and arranged at one side of an axial direction of the second spool valve;
   a second other side pressure chamber disposed in the second valve housing hole and arranged at the other side of the axial direction of the second spool valve;
   a second upstream side supply passage opening section disposed in the second valve housing hole to be opened toward the second one side pressure chamber and communicated with the second pump;
   a second downstream side supply passage opening section disposed to be opened toward the second valve housing hole and communicated with the control valve;
   a second supply passage side land section disposed in the second spool valve to interrupt the second downstream side supply passage opening section with respect to the second one side pressure chamber, when the second spool valve is located at most one side in the axial direction of the second spool valve, and formed in such a way that an opening area of the second downstream side supply passage opening section with respect to the second one side pressure chamber is increased as the second spool valve is moved toward the other side of the axial direction of the second spool valve;
   a second downstream side supply pressure introduction passage disposed in such a way that the second other side pressure chamber is at all times communicated with the control valve; and
   an interruption state detection sensor configured to electrically detect that the second switching valve is in the interruption state, when the second other side pressure chamber is located at most one side of the axial direction,
   wherein the second spool valve is controlled in accordance with a pressure difference before and after the second downstream side passage opening section which is varied in accordance with a change in a flow rate of the working liquid caused to flow into the second downstream side supply passage opening section variably controlled by means of the second supply passage side land section.

6. The power steering system as claimed in claim 4, wherein the power steering system further comprises: a first check valve disposed between the first pump and the first upstream side supply passage opening section to allow the flow of the working liquid only from the first pump side to the second switching valve side; and a second check valve disposed between the second pump and the second upstream side supply passage opening section to allow the flow of the working liquid only from the second pump to the second switching valve side direction.

7. The power steering system as claimed in claim 4, wherein the power steering system further comprises: a contact section disposed in the first switching valve and on which the one side of the axial direction of the first spool valve is contacted when the first spool valve is located at most one side of the axial direction; and an interruption state detection sensor which electrically detects that the first switching valve is in the interruption state when the first spool valve is contacted on the contact section.

8. The power steering system as claimed in claim 1, wherein the power steering system further comprises: a first throttling passage disposed in the first spool valve in order for the first one side pressure chamber to be at all times communicated with the first other side pressure chamber.

9. The power steering system as claimed in claim 1, wherein a power supply turning on quantity caused to flow through the electric motor which is the second driving source is controlled in accordance with a steering speed.

10. The power steering system as claimed in claim 9, wherein a drive of the electric motor which is the second driving source is stopped when the steering speed is smaller than a predetermined value.

11. The power steering system as claimed in claim 9, wherein the power supply turning on quantity caused to flow through the electric motor which is the second driving source is controlled to be increased as the steering speed is increased.

12. The power steering system as claimed in claim 9, wherein the power supply turning on quantity caused to flow through the electric motor which is the second driving source is controlled to be decreased as the vehicle speed is increased.

13. The power steering system as claimed in claim 1, wherein both of the first switching valve and the second switching valve are in the communication state when the working liquid is supplied from each of the first pump and the second pump and wherein the first switching valve or the second switching valve is provided with the interruption state detection sensor which electrically detects the interruption state of the first switching valve or the second switching valve.

14. A power steering system, comprising:
a power cylinder having a pair of pressure chambers and providing a steering force for at least one steered wheel on a basis of a pressure difference between the pair of pressure chambers;
a steering mechanism configured to turn the steered wheel in accordance with a rotational steering operation of a steering wheel;
a pump housing having a pump element housing section at an inner side thereof;
a cam ring disposed movably within the pump element housing section and formed in an annular shape;
a first drive shaft rotatably supported on the pump element housing section and formed in an annular shape;
a rotor disposed within the cam ring, having a plurality of radially extended slits arranged along a circumferential direction of the rotor and rotationally driven through the first drive shaft;
a plurality of vanes movably disposed along the respective slits of the rotor to form a plurality of pump chambers together with the cam ring and the rotor;
a suction inlet disposed in the pump housing and opened to a region of the plurality of pump chambers in which a volume thereof is increased along with the revolution of the rotor;
a draining outlet disposed in the pump housing and opened to a region of the plurality of pump chambers in which a volume thereof is decreased along with the revolution of the rotor;
a suction passage disposed in the pump housing to be communicated with the suction inlet;
a draining passage disposed in the pump housing to be communicated with the draining outlet;
a pair of fluid chambers formed between the pump element housing section and the cam ring, a first fluid pressure chamber thereof being formed at a side at which the volume thereof is decreased along with a movement of the cam ring in a direction toward which an eccentricity of the cam ring with respect to the drive shaft is increased and a second fluid pressure chamber thereof being formed in a direction in which the volume thereof is decreased along with the movement of the cam ring in a direction toward which the eccentricity of the cam ring with respect to the drive shaft is increased;
a control valve disposed in the pump housing to control a pressure in the first fluid pressure chamber to control a displacement of the cam ring according to a pressure difference between the first fluid pressure chamber and the second fluid pressure chamber;
a first pump constituted by an electromagnetic valve, disposed in the pump housing, controlled on a basis of a rotational steering operation of a steering wheel, and which controls a draining quantity per revolution of the rotor by controlling the displacement of the cam ring;
a second pump having a second drive shaft and performing suction and draining of a working liquid along with the revolution of the second drive shaft to supply the working liquid to the power cylinder;
a second driving source which is the driving source different from the first driving source, is constituted by an electric motor, and rotationally drives the second pump;
a control valve disposed in the steering mechanism to selectably supply the working liquid supplied from the first pump or the second pump to the pair of pressure chambers in accordance with the rotational steering operation of the steering wheel; and
switching valves disposed among the first pump, the second pump, and the control valve to switch a communication of the working liquid and an interruption thereof between the first pump and the control valve and to switch the communication of the working liquid and the interruption thereof between the second pump and the control valve.

15. The power steering system as claimed in claim 14, wherein the power steering system further comprises a single chip which is an integrated circuit, the chip having a first recording medium storing an electromagnetic valve control program to drivingly control the electromagnetic valve and a second recording medium storing a motor control program to drivingly control the electric motor.

16. The power steering system as claimed in claim 14, wherein the power steering system further comprises: a first chip which is an integrated circuit; a first recording medium installed in the first chip and on which an electromagnetic control program to drivingly control the electromagnetic valve is recorded; a second chip which is another integrated, circuit which is different from the first chip; a second recording medium installed in the second chip and on which a motor control program to drivingly control the electric motor is recorded; and a frame to house the first chip and the second chip.

* * * * *